United States Patent [19]
Craig et al.

[11] Patent Number: 5,345,091
[45] Date of Patent: * Sep. 6, 1994

[54] BARCODE IDENTIFICATION SYSTEM

[76] Inventors: Gina M. Craig, 2334 Mardell Dr., Dayton, Ohio 45459; Dale E. Lamprecht, Jr., 3265 Green Turtle Dr., Dayton, Ohio 45414; Debra A. Stellwag, 528 Heather Dr., Apt. 2, Dayton, Ohio 45405; Thomas R. Wagner, 6298 Greenbriar Dr., Fairfield, Ohio 45014

[ * ] Notice: The portion of the term of this patent subsequent to Jul. 13, 2010 has been disclaimed.

[21] Appl. No.: 44,817

[22] Filed: Apr. 8, 1993

Related U.S. Application Data

[63] Continuation of Ser. No. 783,770, Oct. 28, 1991, Pat. No. 5,227,643.

[51] Int. Cl.5 .............................................. G06K 7/10
[52] U.S. Cl. ...................................... 250/566; 235/462
[58] Field of Search .................. 250/566, 556; 346/23; 235/454, 462, 472

[56] References Cited

U.S. PATENT DOCUMENTS 3,784,795  1/1974  Tuhro ................................. 250/566
4,736,109  4/1988  Dvorzsak ............................ 250/566

Primary Examiner—David C. Nelms
Assistant Examiner—K. Shami
Attorney, Agent, or Firm—McAndrews, Held & Malloy

[57] ABSTRACT

A barcode identification system is shown that includes a user operable personal computer for creating print jobs. The personal computer is coupled to a number of printers for printing the data for a job in a selected format on a record member such as a tag, label or the like. The system employs modular software. During the initialization of each of the software modules, the system determines whether the module includes a key identification that matches a system key and if not, the operation of the software module is limited to a demonstration mode if that mode is allowable. A data entry routine aids the user entering valid data for a selected format. In response to a print command, the data entered by the user is combined with the selected format to form a job. The job is then sent to a spooler which distributes the job to one of the barcode printers of the system.

10 Claims, 25 Drawing Sheets

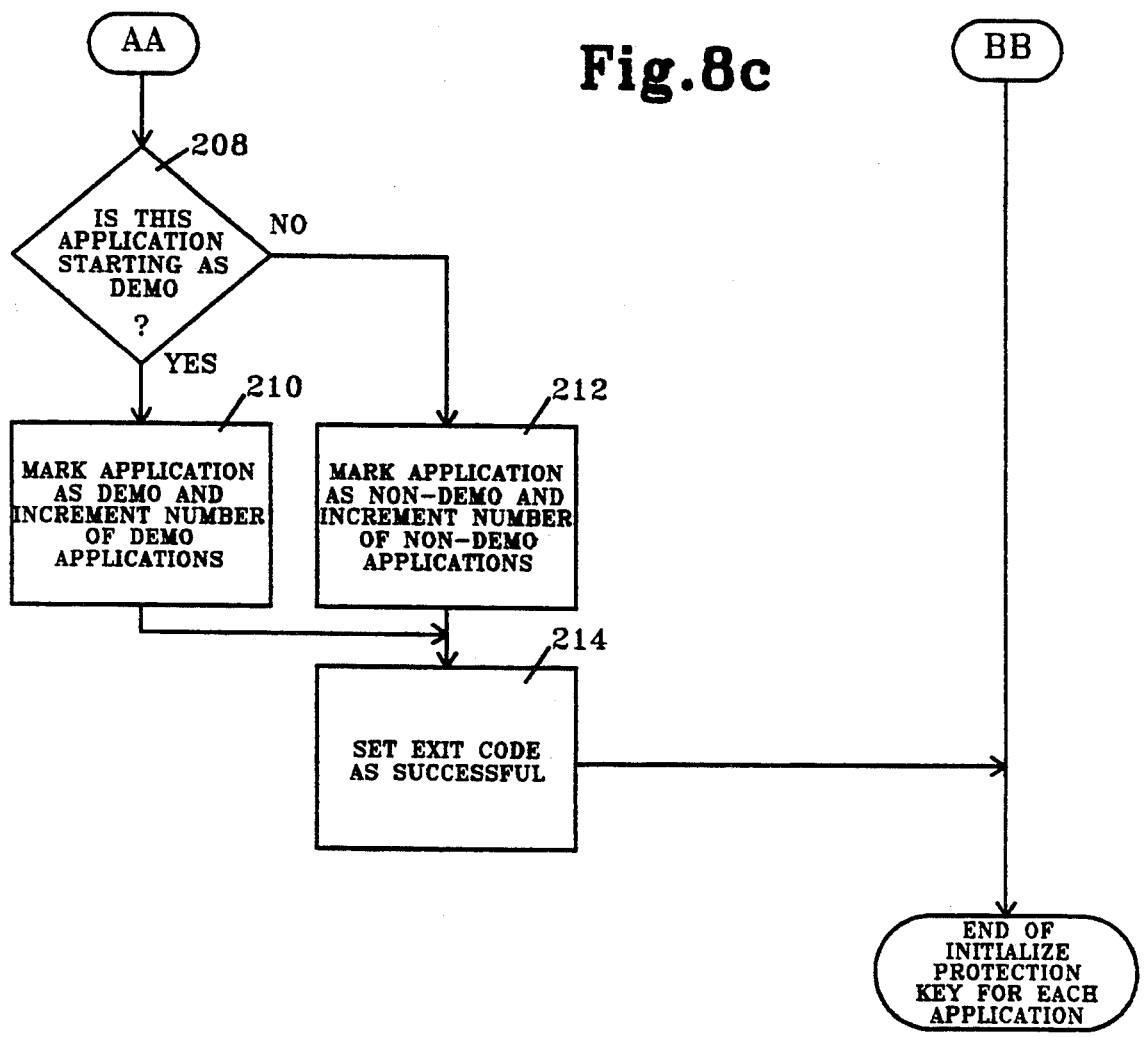

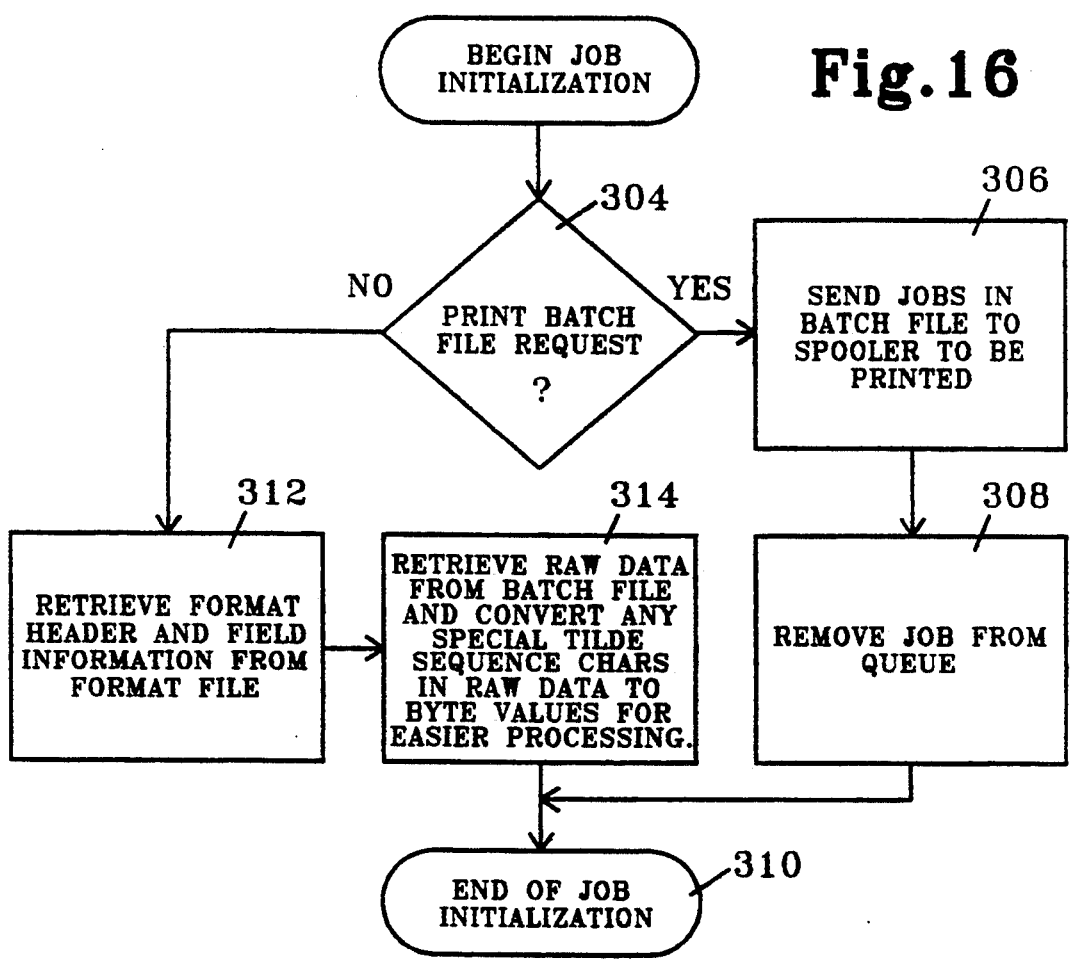

BARCODE IDENTIFICATION SYSTEM

This application is a continuation of application Ser. No. 07/783,770, filed Oct. 28, 1991, now U.S. Pat. No. 5,227,643.

TECHNICAL FIELD

The present invention is directed to a barcode identification system that includes a number of software modules to control the operation thereof, the system as well as each software module being key protected; and more particularly to such a system that includes a data entry module to aid the user in entering valid data to be printed in accordance with a selected format on a tag, label or the like.

BACKGROUND OF THE INVENTION

Barcode identification systems are known for printing jobs that include barcodes and associated alphanumeric characters on a web of record members such as tags, labels or the like. Known barcode information systems typically are not modular in nature in that the systems require a fixed number of software routines for controlling data entry, format creation, etc. Because the systems are not modular, if a user does not want to create his own formats for example, the user is still required to purchase system software that includes a format creation capability. Further, the data entry procedures for known barcode identification systems are typically very difficult to implement. Information to be printed on a record member by a barcode identification system is usually divided into a number of fields such as a barcode field, text field, etc. wherein the layout of the fields is determined by the format selected by the user. Once a format is selected, the user enters data for each of the fields. Often the fields have input restrictions that limit the type of valid characters that may be input. Because of the various input restrictions for data entry and the lack of prompts to aid a user to enter field data, known barcode identification systems can typically be operated only by very experienced users.

SUMMARY OF THE INVENTION

In accordance with the present invention, the disadvantages of prior barcode identification systems have been overcome. The barcode identification system of the present invention is modular in nature so that if a user needs only particular software modules to suit his needs for creating record members such as tags, labels or the like, the user need only purchase those particular modules. Further, each of the modules as well as the system is key protected so that only authorized software modules may be used in the system. A data entry module is provided to aid the user in entering valid data to be printed in accordance with a selected format so that a user does not have to be extremely experienced in order to create a job to be printed by the system.

More particularly, the barcode identification system of the present invention includes a personal computer that operates in accordance with a plurality of software modules for creating barcode identification information to be transmitted to one or more barcode printers. Upon the initialization of each of the software modules, the system determines whether the software module includes a key identification that matches a system key identification. If the software module does not include a matching key identification, the operation of the software module is limited to a demonstration mode. In the demonstration mode, the total time that the software module can operate is limited as well as the time between successive initializations of the software module. The system key employed may be of a type that is removable. However, in order to prevent the system key from being removed during the operation of the system, means are provided for periodically checking to determine whether the system key is present. Operation of all of the software modules is terminated if it is determined that the system key has been removed.

One of the software modules of the present invention is a data entry module that controls a display to display data entry prompts to the user in the form of templates. Each template has a fixed number of single character input positions wherein each of the input positions has an associated individual restriction as to the type of character that is valid for that position. Each input position character restriction is encoded so as to be represented by a single character. Prior to data entry, the displayed template depicts, in each input position, the character representing the restriction associated with that input position. As the user inputs each character into the template, the character representing the input position's restriction is replaced by the data character entered for that input position so as to aid the user in entering valid data for printing on a record member.

The templates employed by the barcode identification system of the present invention, although having a fixed number of single character input positions, can accommodate single characters that require the input of a plurality of characters to define that single character. The system is responsive to a predetermined symbol entered into a single input position of the template to automatically adjust the length of the displayed template to prompt the user to enter the plurality of characters necessary to define the single character.

These and other objects, advantages and novel features of the present invention, as well as details of an illustrated embodiment thereof will be more fully understood from the following description and from the drawing.

BRIEF DESCRIPTION OF THE DRAWING

FIGS. 8A, 8B and 8C form a flow chart key identification validation routine called by each of the software modules of the present invention;

FIG. 16 is a flow chart illustrating a perform initialization on expansion job routine;

DESCRIPTION OF THE PREFERRED EMBODIMENT

Figure 1:
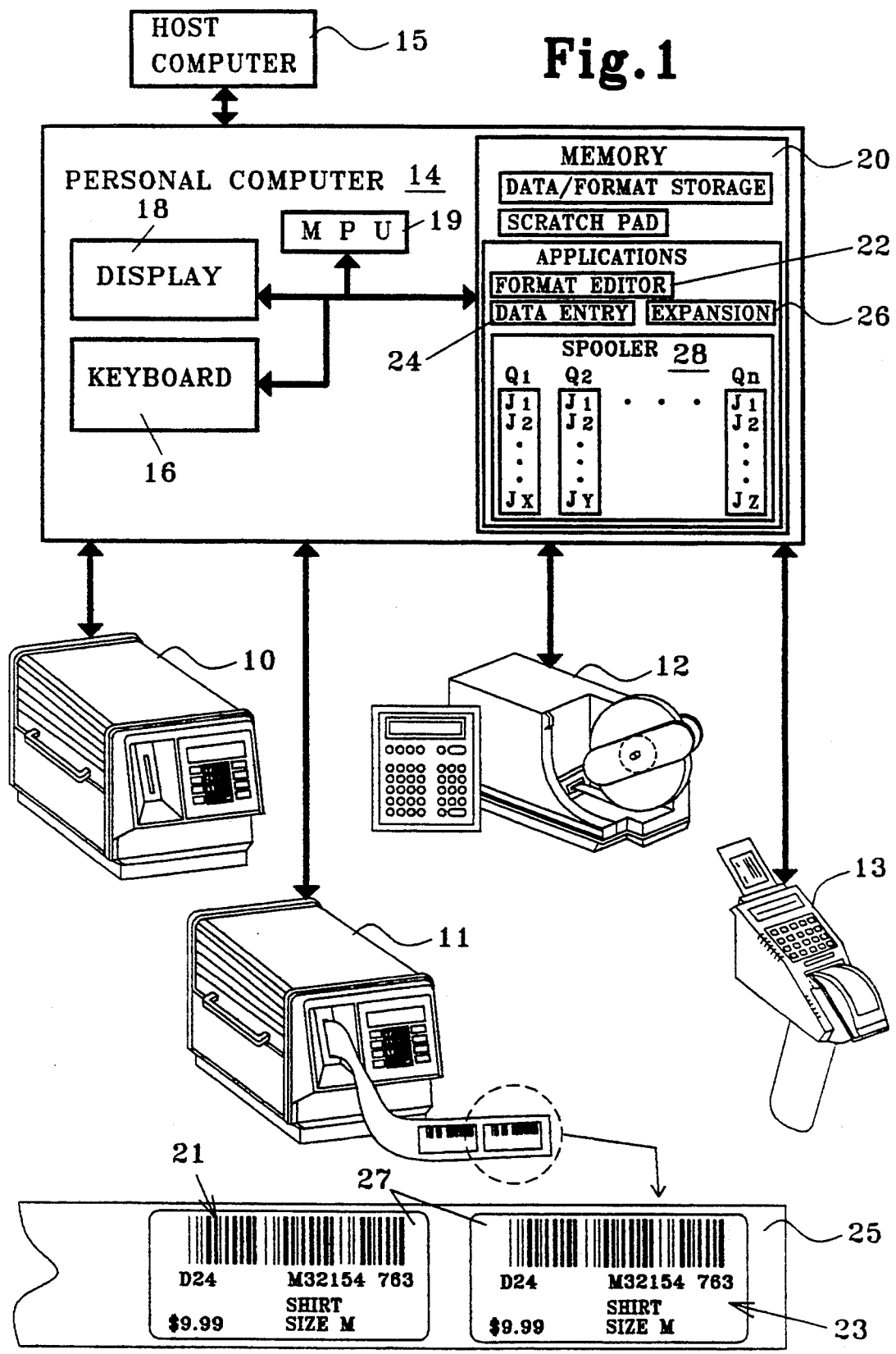
FIG. 1 is a block diagram of the barcode identification system of the present invention illustrating a number of printers in perspective view.

The barcode information system of the present invention as shown in FIG. 1 allows a user to print, via a number of barcode printers 10, 11, 12 and 13, jobs entered into the system via a personal computer 14 hereinafter referred to as the P.C. 14. Each of the printers 10–13 is connected to the P.C. 14 through a RS 232 interface or the like. The system of the present invention also allows a host computer 15 to interface with the barcode printers 10–13 via the P.C. 14 so that print jobs or portions thereof can originate with the host computer. The P.C. 14 includes a keyboard 16 for entering information into the system in order to create a job to be printed. The P.C. 14 also includes a display 18 to prompt the user to enter particular information and to provide feedback to the user regarding the operation of the system. The P.C. 14 includes a microprocessor 19 that operates in accordance with application software stored in a memory 20 to create the information necessary to print a job on one or more of the printers 10–13.

The barcode printers of the system may be compatible such as printers 10 and 11 in that these printers communicate in the same language and/or have the same user selectable format options defining the way in which barcode data 21 and related alphanumeric data 23 may be printed on a web 25 of record members 27 such as tags, labels or the like. Alternatively, the barcode printers of the system may be incompatible such as printers 10, 12 and 13 in that the printers do not speak the same language and/or do not have the same user selectable format options. The barcode identification system allows a user to define multi-printer formats for a job to allow a job to be printed on any one of the incompatible printers for which the job was created.

To create a typical barcode print job, the user first creates a format for the job utilizing a format editor routine 22. The format editor 22 allows a user to create a single format for a number of incompatible printers. Once the user selects the printers for a format to be created or modified, the format editor 22 automatically prompts the user to create a multi-printer format by providing to the user for his selection only those format options that are common to all of the printers selected by the user for a format. Thus the multi-printer format created is compatible with each of the otherwise incompatible printers. A suitable format editor routine is depicted in U.S. Pat. No. 5,239,622 entitled Barcode Identification System Format Editor, filed concurrently herewith, which is assigned to the assignee of the present invention and incorporated herein by reference.

After a format for one or more print jobs is created, a user may run a data entry routine 24 to interface with the user, prompting the user to select the format to be utilized for a job and to enter data for the job. As discussed in detail below, the data entry routine of the present invention prompts the user to enter valid data so that a user need not be extremely experienced in order to create jobs to be printed by the system. When a job is ready to be printed as indicated by a user via the keyboard 16, an expansion routine 26 combines the data entered during the operation of the data entry routine 24 with the designated format generated by the format editor 22 and sends a print command to a spooler 28 as discussed in detail below.

When the spooler 28 receives the print command for a job, the spooler looks at the destination queue designated in the print command and determines whether there is a printer assigned to the designated queue that is capable of printing the job. The spooler 28 may be configured by a user to assign one printer to one queue; multiple printers to one queue or multiple queues to one printer. Each printer assigned to a given queue may not be capable of printing every job listed in that queue. When the spooler 28 receives a print command for a job, the spooler determines whether there is one printer assigned to the job's destination queue that is of a type listed in the job's print command as being capable of printing the job's format. If so, the spooler adds the job to the designated destination queue in a position associated with the job's designated priority. The spooler 28 monitors the status of each of the printers 10–13 to determine when a given printer is ready to receive a job for printing. When the spooler 28 finds a printer that is ready to print a job, the spooler searches each of the queues for the highest priority job capable of being printed on the same type of printer as the ready printer. Thereafter the spooler transfers the highest priority job that is found to the ready printer for printing. A suitable spooler is disclosed in U.S. Pat. No. 5,287,434 entitled Barcode Identification System Spooler, filed concurrently herewith, which is assigned to the assignee of the present invention and incorporated herein by reference.

Figure 2:
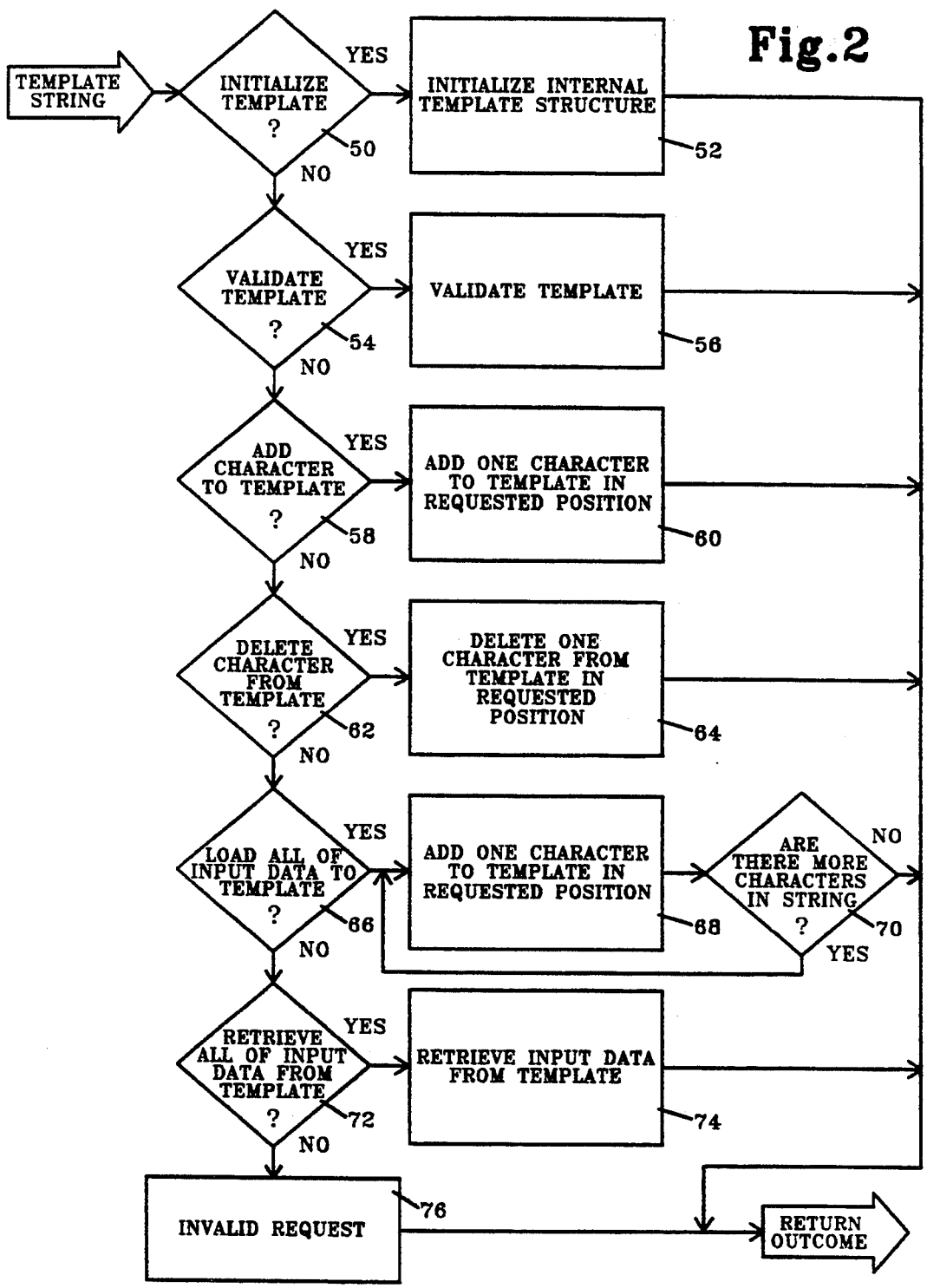
FIG. 2 is a flow chart illustrating the data entry routine of the present invention.

FIG. 2 illustrates a portion of the data entry routine 24 for handling the input of template data. A template is a character string that is used to control how a user may enter data into a field. In order to have a single template that may specify fixed characters as well as define input characters, the template is broken into three possible tokens: the actual input mask and fixed data before and after the input mask. The input mask of each template has a fixed number of character input positions. Each input position may be assigned a different input type restriction as opposed to having one restriction limiting the input type of the entire template. Each type of input restriction is encoded so as to be represented by a single character. For example, the character "A" may be used to represent that a given input position is restricted to an alpha character; the character "#" may be used to restrict an input position to a numeric character; etc. When the template is first displayed via the display 18 to a user prior to data entry into the template, the character representing the restriction for a given input position is displayed in that input position. A cursor is positioned to point to the first input position. When a user enters a valid character for the first input position, the entered character replaces the character representing the restriction for the input position on the displayed template and the cursor is moved to point to the second input position of the template and so on. The template thus aids the user in entering valid data for each field of the job being created. It is noted that the input mark for the template may also include fixed characters in a number of the input positions.

Although each template has a fixed length, i.e., a fixed number of character input positions, the template processing of the present invention can accommodate a single character capable of being printed by one of the barcode printers but that requires the input of a plurality of characters to define that one character so that it is recognizable by a printer 10, 11, 12, 13. More particularly, a particular symbol such as the tilde symbol, i.e. "~", may signal to a particular barcode printer that a function code for the printer is to follow, wherein the function code requires three input positions. The barcode printer however may be capable of printing the "~" symbol itself. In order to distinguish whether it is the tilde symbol that is to be printed or a tilde function code, the microprocessor is responsive to a tilde entered into a given input position of a template, where such a symbol is allowed, by automatically inserting three extra input subpositions or place holders following the tilde in the template displayed to the user on the display 18. If the next character entered following the first tilde is a second tilde, the last two added input positions are eliminated since a sequence "~~" represents that the tilde symbol itself is to be printed on a record member. If however the first tilde is followed by a numeric, the two remaining place holders are maintained on the display to prompt the user to enter the remaining two digits of a three-digit function code. Therefore, the template of the present invention is extremely flexible in accommodating characters that cannot be recognized by a printer from the input of a single character.

More particularly, in processing templates, as shown in FIG. 2, the microprocessor 19 at a block 50 first determines whether the user wants to initialize a template and if so proceeds to block 52 to initialize the internal structure thereof. At block 54 the microprocessor 19 determines whether the user wants to validate a template and if so at block 56 the microprocessor validates the template. At block 58 the microprocessor 19 determines whether the user is adding a character to the template and if so, the microprocessor calls the routine depicted in FIG. 3 to process the adding of a character to the template.

Figure 3:
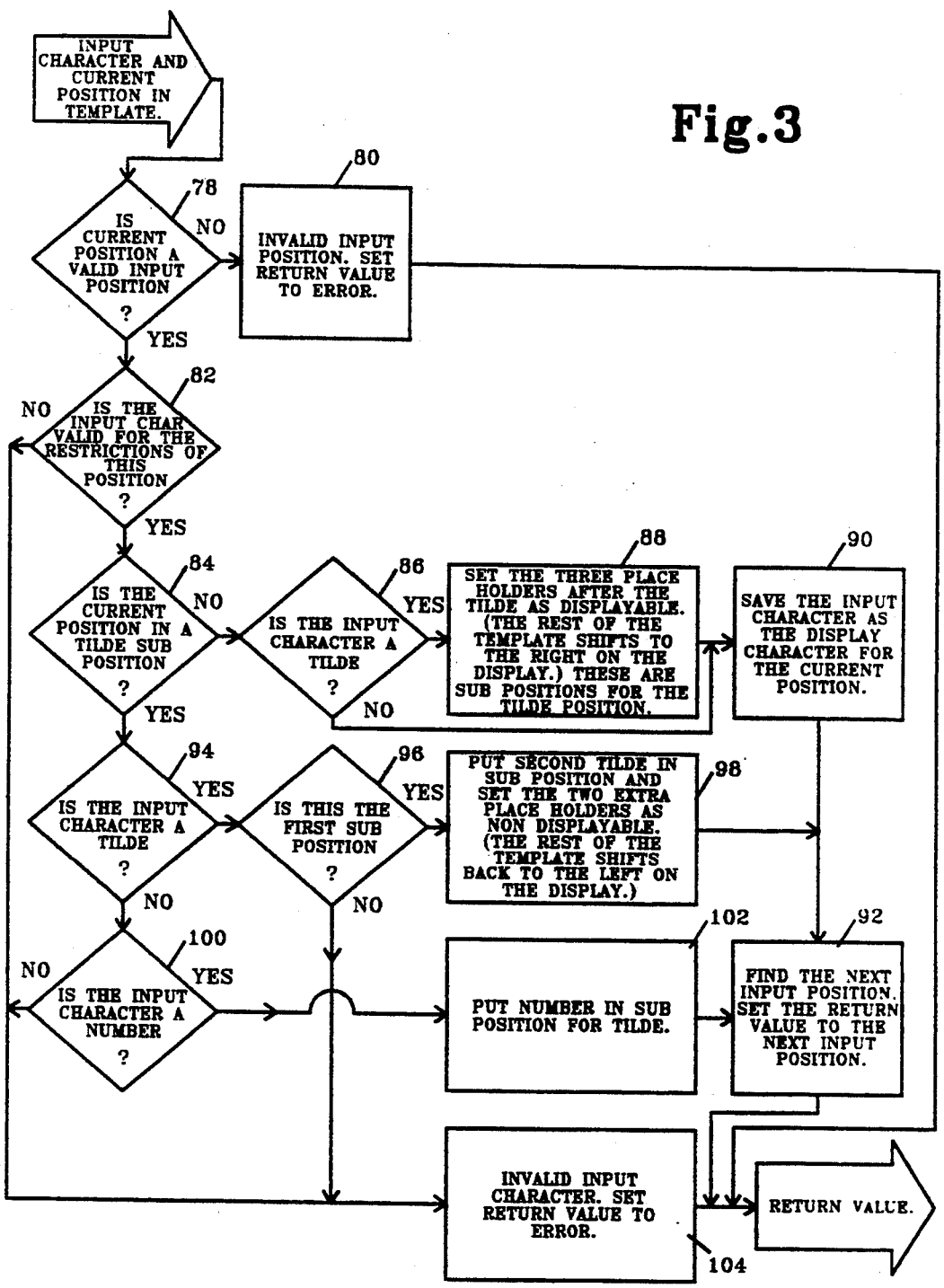
FIG. 3 is a flow chart illustrating a routine for adding a character to a template as called by the routine depicted in FIG. 2.

As shown in FIG. 3, the microprocessor 19 first determines at block 78 whether the current position of a displayed cursor is a valid input position. If not, the microprocessor at block 80 indicates that the input position is invalid, setting a return value to indicate an error. If, however, the microprocessor 19 determines at block 78 that the current position of the cursor is pointing to a valid input position, the microprocessor proceeds to block 82. At block 82 the microprocessor 19 determines whether the character entered by the user for a given input position is valid for the restriction associated with that input position. If the input character is not of the type required by the input position's restriction, the microprocessor 19 proceeds to block 104 to indicate an invalid input character, setting a return value to indicate an error. If the input character is valid for the input position, the microprocessor 19 proceeds from block 82 to block 84 to determine whether the current position is in a tilde subposition. If not, the microprocessor at block 86 determines whether the input character is a tilde. If the input character is not a tilde, the microprocessor 19 proceeds from block 86 to block 90 to save the character entered by the user as the input character for the input position. At block 90 the microprocessor 19 also controls the display 18 to display the input character in the input position so that it replaces the character representing the restriction associated with the input position. From block 90 the microprocessor proceeds to block 92 to find the next input position and to increment the displayed cursor to the next input position. If the microprocessor 19 determines at block 86 that the input character is a tilde, the microprocessor proceeds to block 88. At block 88 the microprocessor sets three placeholders after the tilde in the displayed template so that the rest of the template shifts to the right on the display 18. These three placeholder positions are subpositions for the tilde sequence. When the user enters input data to the template, if the microprocessor 19 determines at block 84 that the current position in the template is a tilde subposition, the microprocessor proceeds to block 94 to determine whether the character input by the user in the first tilde subposition is another tilde. If so, the microprocessor proceeds to block 96 to determine whether the input position is the first subposition in the tilde sequence. If not, the microprocessor 19 proceeds to block 104 indicating an invalid input character since a tilde can only be in the first subposition of a tilde sequence. If the microprocessor 19 confirms that the second tilde entered is in the first subposition of the tilde sequence, the microprocessor proceeds to block 98. At block 98, the microprocessor displays a second tilde in the first subposition and sets the two extra placeholders previously set at block 88 to non-displayable so that the remainder of the template shifts back to the left on the display. From block 98 the microprocessor proceeds to block 92 to increment the cursor to the next input position of the template. If the microprocessor at block 94 determines that the input character in a tilde subposition sequence is not a second tilde, the microprocessor 19 proceeds to block 100. At block 100 the microprocessor determines whether the input character is a number. If not, the microprocessor proceeds to block 104 to indicate an invalid input character. If, the input character in the tilde subposition is a number, at block 102 the microprocessor 19 displays the number in the tilde subposition of the template. The microprocessor then proceeds to block 92. The microprocessor 19 in accordance with the routine depicted in FIG. 3 thus automatically accommodates the inputting of special characters into a fixed length template where the special character requires a variable number of input positions to define the character so that it is recognizable by a barcode printer 10, 11, 12, 13.

Figure 4:
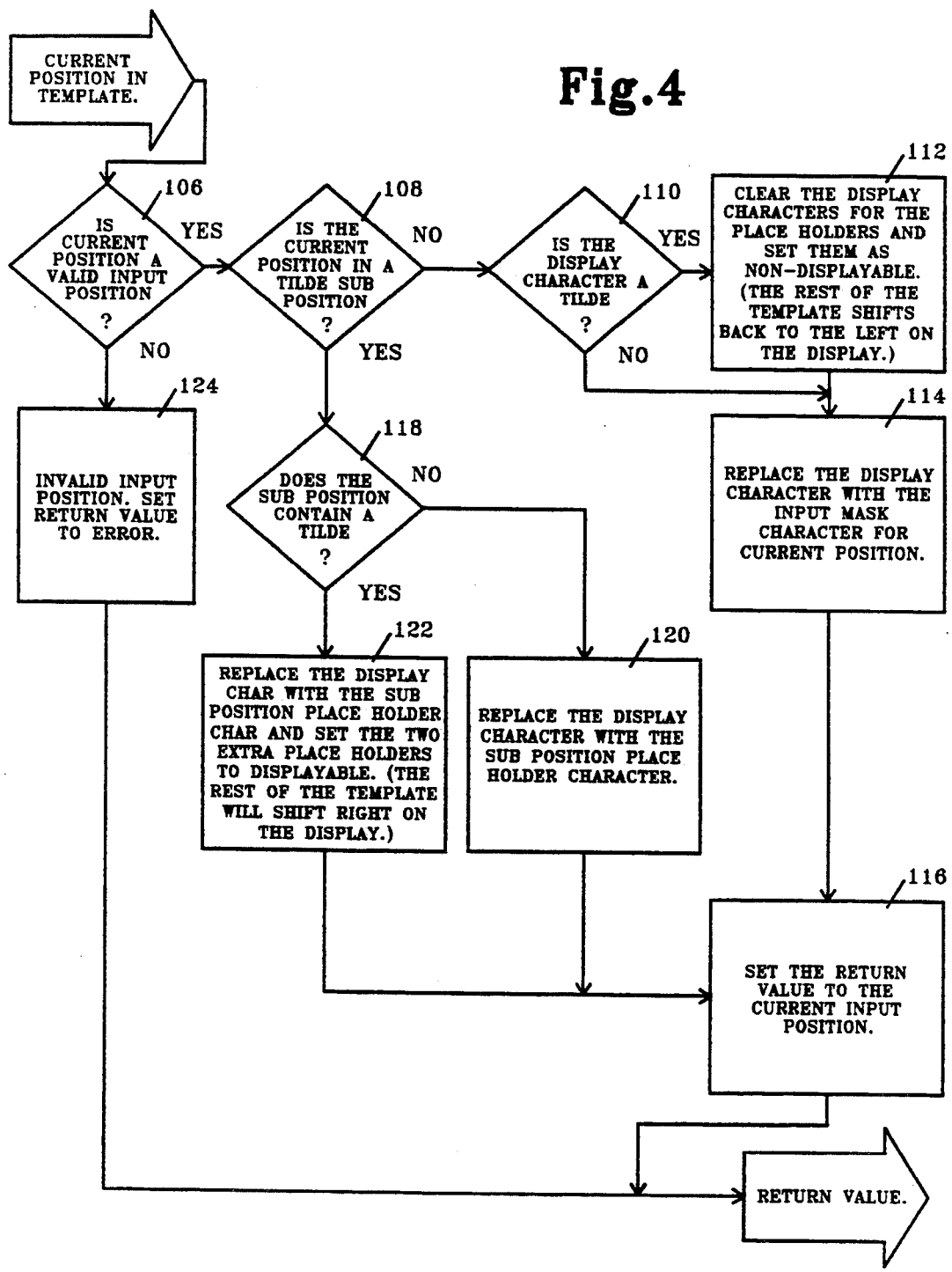
FIG. 4 is a flow chart illustrating a routine for deleting a character from a template as called by the routine depicted in FIG. 2.

Returning to FIG. 2, if the microprocessor 19 determines at block 62 that the user wants to delete a character from a displayed template, the microprocessor 19 proceeds to block 64 to call the routine depicted in FIG. 4 for processing the deletion of a character from a template. As shown in FIG. 4, the microprocessor 19 at block 106 first determines whether the current position is a valid input position. If not, the microprocessor at block 124 indicates that the input position is invalid, setting a return value to indicate an error. If the current position is a valid input position, the microprocessor proceeds to block 108. At block 108 the microprocessor 19 determines whether the current position is a tilde sequence subposition and if not, the microprocessor 19 proceeds to block 110. At block 110 the microprocessor determines whether the displayed character is a tilde and if not, the microprocessor at block 114 replaces the character previously input by the user to the template with the input mask character representing the input restriction associated with that current input position. From block 114 the microprocessor proceeds to block 116 to set the return value to the current input position. If the microprocessor 19 determines at block 110 that the current input position is displaying a tilde, the microprocessor proceeds from block 110 to block 112. At block 112 the microprocessor clears the displayed characters in the tilde sequence, the placeholders in the sequence becoming non-displayable. The rest of the template then shifts back to the left on the display 18. If the microprocessor at block 108 determines that the current position is a tilde sequence subposition, the microprocessor proceeds from block 108 to block 118. At block 118 the microprocessor 19 determines whether the tilde subposition contains a tilde. If the subposition does not contain a tilde, the microprocessor proceeds to block 120 to replace the character previously input by the user in the subposition with a placeholder for the subposition, effectively erasing the character from the tilde subposition. Thereafter, the microprocessor proceeds to block 116. If, however, the microprocessor 19 determines that the subposition does contain a tilde, the microprocessor proceeds to block 122 to replace the tilde displayed in the subposition with a subposition placeholder character and further displays two extra placeholders. The remainder of the template then shifts to the right on the display 18.

Returning to FIG. 2, the microprocessor 19 determines at block 66 whether an input data string is to be added into a template and if so, at block 68 the microprocessor 19 calls the routine depicted in FIG. 3 for adding one character to the template as discussed above. After adding one character, the microprocessor 19 then proceeds to block 70 to determine whether there are more characters in the data string to be added to the template and if so, the microprocessor 19 loops back to block 68 from block 70 to add the next character. The microprocessor continues adding characters from the input data string to the template until there are no more characters in the string as determined at block 70. If the microprocessor determines at block 72 that the user wants to retrieve all of the input data from a template, the microprocessor proceeds to block 74 to retrieve the input data therefrom.

The data entry routine 24 also allows a user to search a database in the memory 20 that stores data for various fields to be printed. Data for each field stored in the data base includes a search key associated therewith to allow the microprocessor 19 to look up the data for a field in response to a search key input by a user via the keyboard 16. The microprocessor 19 controls the display 18 to depict not only the entered search key or search keys, but also controls the display 18 to display the database result field, i.e. the record formed by the data fields that are retrieved in the search.

Figure 5:
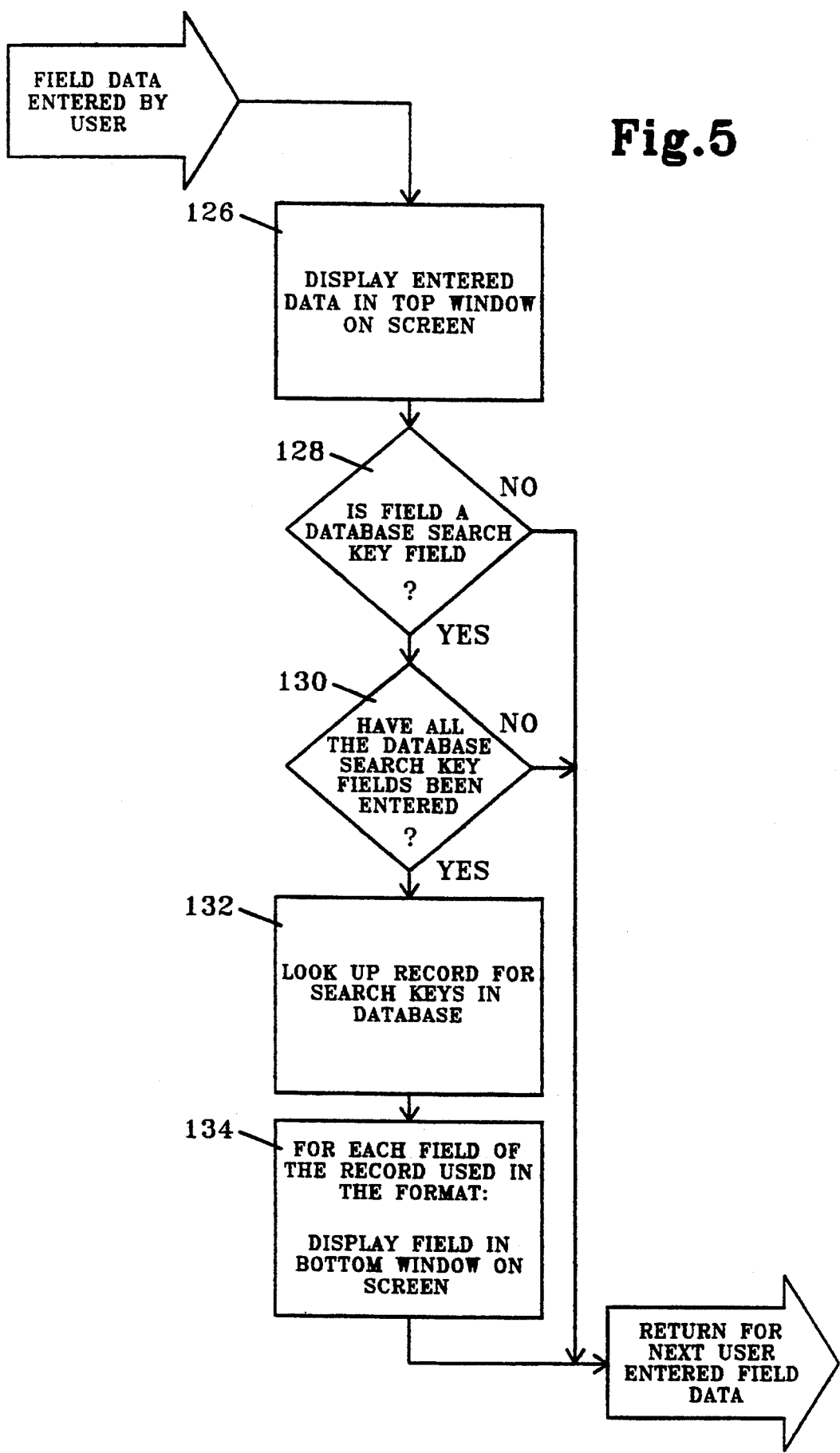
FIG. 5 is a flow chart illustrating a data base result fields look up and display routine.

More particularly, as shown in FIG. 5, when the microprocessor 19 determines that field data is entered by a user, the microprocessor at block 126 displays the entered field data in a top window on the screen of the display 18. Thereafter, the microprocessor at block 128 determines whether the entered field data is a database search key field and if not, the microprocessor exits the routine. If, however, the microprocessor 19 determines that the entered field data does represent a database search key, the microprocessor 19 proceeds to block 130 to determine whether all of the database search key fields have been entered for a given record. If not, the microprocessor 19 exits the routine to prompt the user to enter the remaining database search key fields. If all of the database search keys have been entered for a given record, the microprocessor proceeds to block 132 to look up the record for the search keys from the database of the memory 20. The microprocessor at block 134 then controls the display 18 to display the data for each field of the record associated with the input search keys. Because database result fields are displayed, the user is able to determine whether the data that was expected to be retrieved from a search is correct before the data is printed in a selected format.

Figure 6:
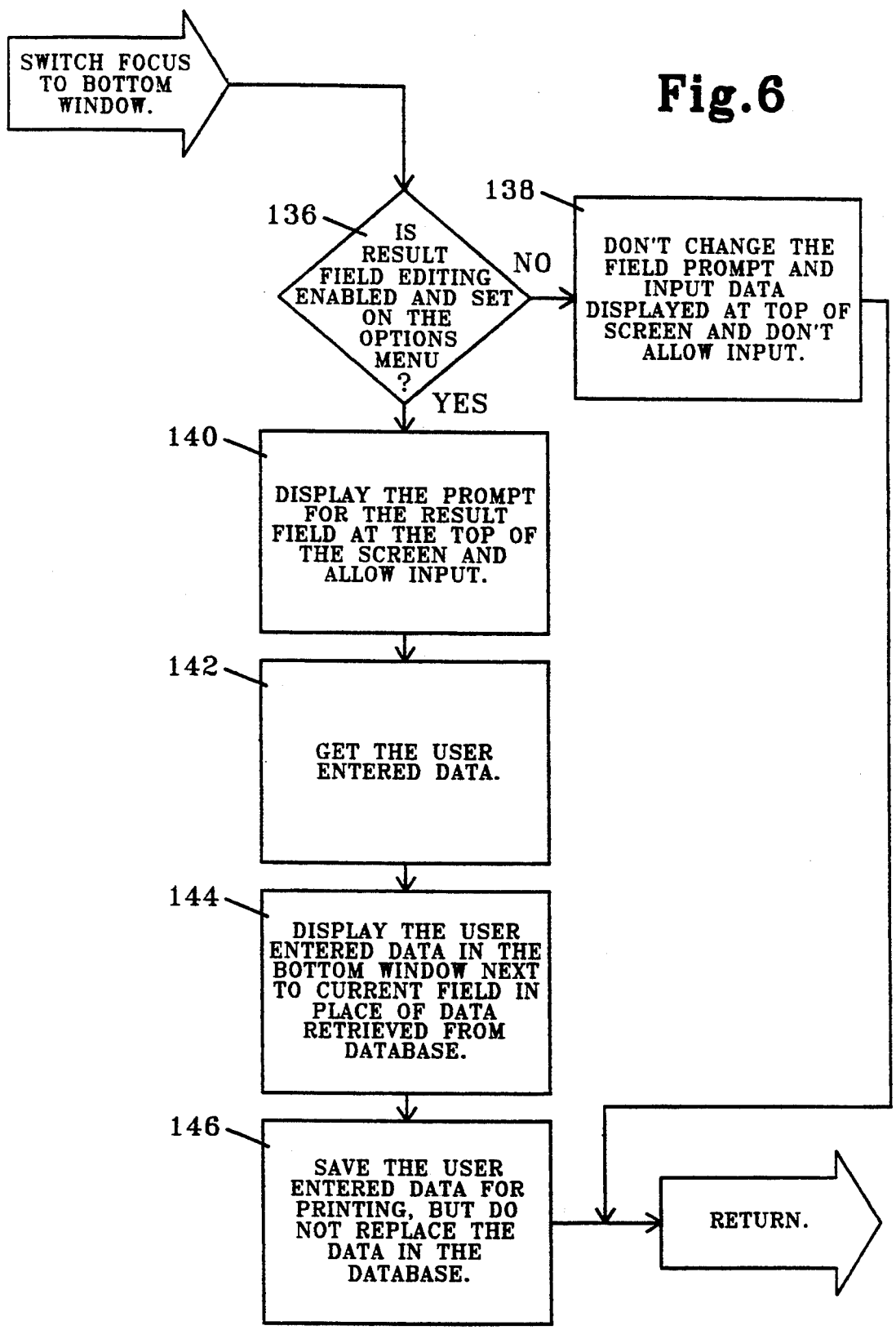
FIG. 6 is a flow chart illustrating a data base result fields user editing routine.

The database result fields depicted on the display 18 can be edited by the user without affecting the actual database records. This option can be password protected. For example, as depicted in FIG. 6, if the microprocessor determines at block 136 that a result field editing option has been enabled and has been selected by a user from an options menu, the microprocessor proceeds to block 140 to display a prompt in a window at the top of the display screen 18 for the result field depicted in a window at the bottom of the screen 18. If, however, the microprocessor determines at block 136 that the result field editing option has not been enabled or set on the options menu, the microprocessor proceeds to block 138. At block 138, the microprocessor 19 does not change the field prompt or result field depicted on the display 18 and further does not allow a user input to modify the result field. From block 140 the microprocessor proceeds to block 142 to get the new data entered by a user. At block 144 the microprocessor 19 then displays in a window the user entered data adjacent to the current field in place of the data previously retrieved from the database. At block 146 the microprocessor saves the user entered data for printing; but does not replace the field data stored in the database of the memory 20. This feature allows a user who is authorized and has the proper password to modify data represented in a database result field so that the modified field may be printed without modifying the field data stored in the database. This feature may be used, for example, where a user wants to modify the selling price of an item for a sale without affecting the price of the item stored in the database. When the sale is over, tags or labels can be printed with the nonsale price of the item depicted thereon without having to modify any stored field data.

Figure 7:
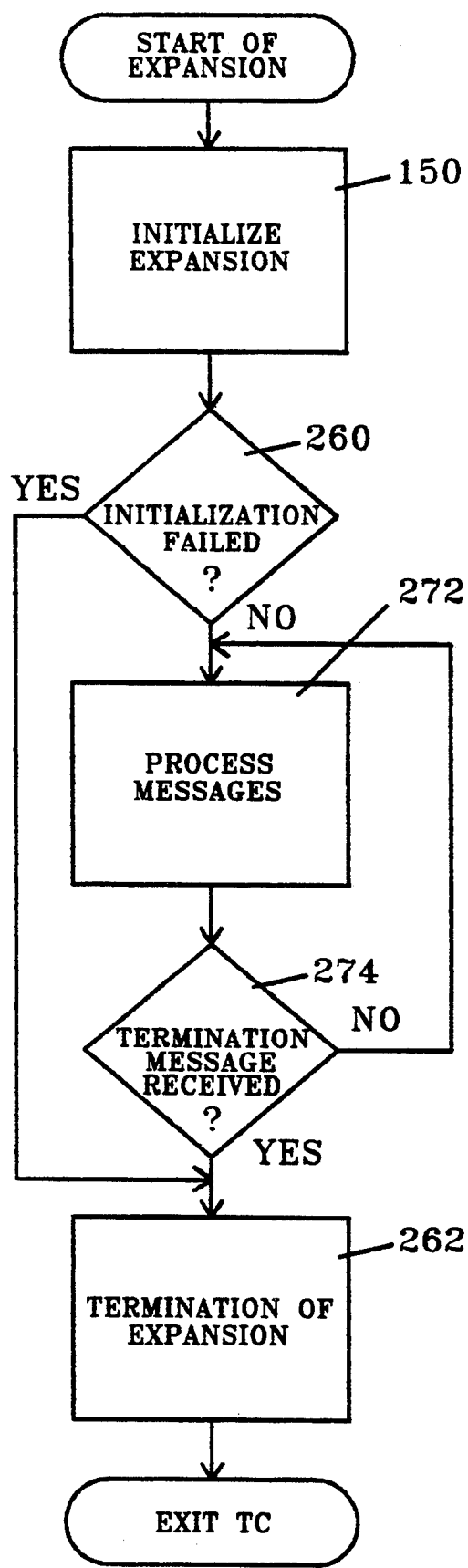
FIG. 7 is a flow chart illustrating an Expansion routine.

After a user creates a job by selecting a format and entering or retrieving the data for each field of the format, an Expansion routine depicted in FIG. 7 is called to combine the selected format and data in order to create the job so that it may be sent to the spooler for distribution to a printer for printing. The expansion routine further performs various processes and validation procedures as discussed in detail below. When the expansion routine is first loaded from disk into the memory 20, the microprocessor 19 initializes the expansion routine at a block 50. More particularly, at block 150 the microprocessor 19 initializes various parameters and calls a key validation routine as depicted in FIG. 8.

The software of the system of the present invention is modular in nature in that not every one of the software modules such as the format editor 22 or data entry routine 24 is required for the system to operate. Only the spooler module 28 is actually required since the spooler controls the transmission of print jobs to the printers 10–13. In order to protect the system and prevent unauthorized use thereof a system key is employed. A suitable key is manufactured by Software Security Inc. and is called the Activator. The Activator is a keyed block that is connected to the parallel communication port of the P.C. 14 wherein the Activator block provides a system key identification that may be read by the P.C. 14 without interfering with the communications of the P.C. via the port to which the block is connected.

Figure 11:
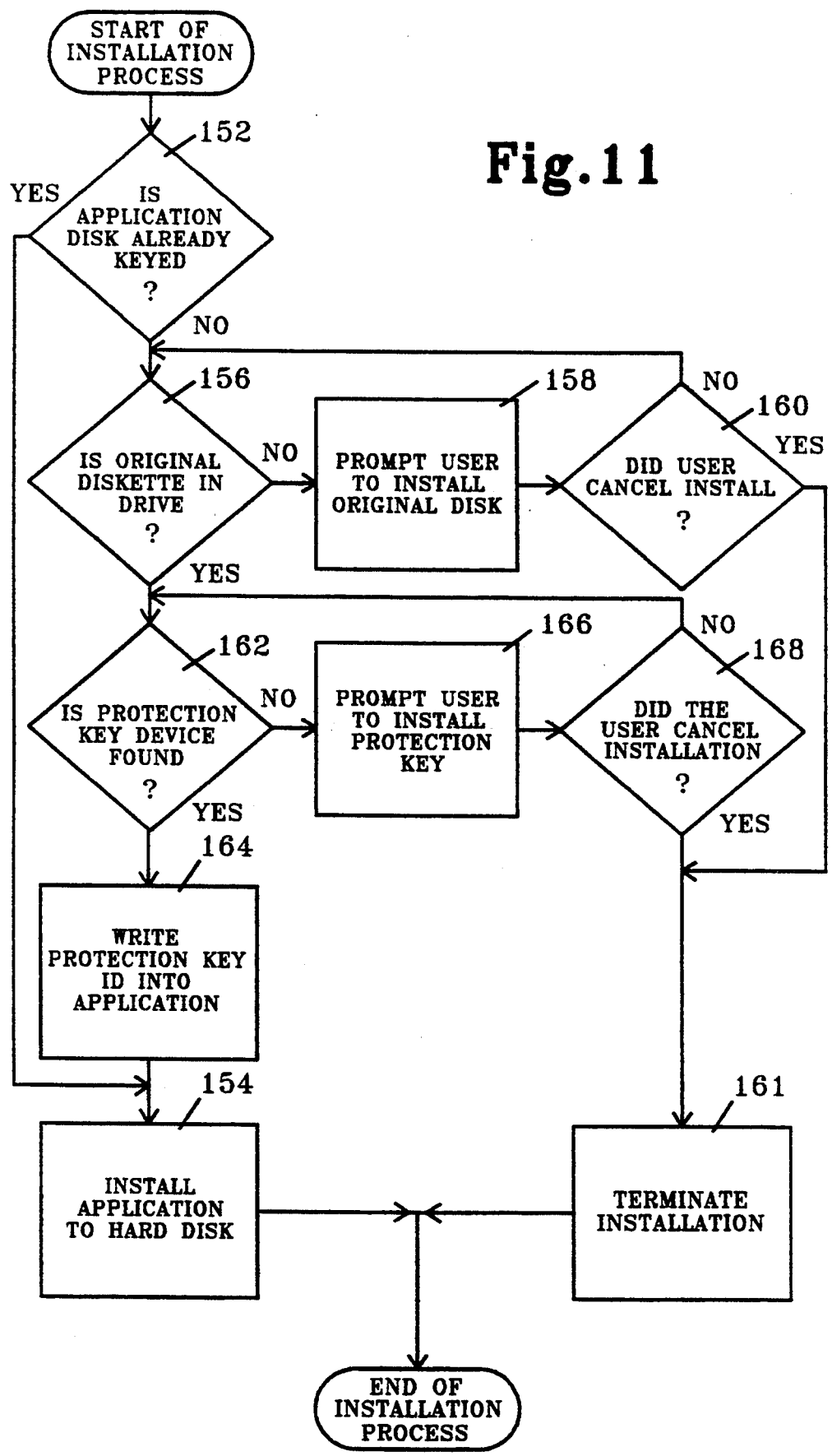
FIG. 11 is a flow chart illustrating a key installation routine.

Each of the software modules that are authorized for operation in the system are programmed by a key installation routine depicted in FIG. 11. Each software module must include a key identification that matches the system key identification provided by the Activator block or the microprocessor 19 prevents the application from operating normally. More particularly, if the microprocessor 19 does not find a matching key in the software module, the microprocessor 19 limits the operation of the software module to a demonstration mode if the demonstration mode is allowable as discussed in detail below. As shown in FIG. 11, during the key installation process, the microprocessor 19 at a block 152 first determines whether the software module or application has already been keyed or not and if so, the application is installed to a disk at block 154. If however, the microprocessor 19 determines at block 152 that the application has not already been keyed, the microprocessor proceeds to block 156. At block 156 the microprocessor determines whether the original diskette is installed in the drive for the P.C. 14 and if not, the microprocessor 19 at block 158 prompts the user to install the original diskette. Thereafter, at block 160 the microprocessor determines whether the user has canceled the installation process and if not, the microprocessor proceeds back to block 156 to determine whether the original diskette has now been installed in the drive of the P.C. 14. If the microprocessor determines at block 160 that the user has canceled the installation process, the microprocessor 19 proceeds to block 161 to terminate the application. If, the microprocessor 19 determines at block 156 that the original diskette is in the disk drive of the P.C. 14 the microprocessor proceeds to block 162 to determine whether the system key is found, i.e., whether the Activator block is connected to the parallel communication port of the P.C. 14. If not, the microprocessor at block 166 prompts the user to install the system key and at block 168 determines whether the user has canceled the installation process or not. If the microprocessor determines at block 162 that the system key is found, the microprocessor proceeds to block 164 to write the system key identification into the application. Thereafter, the microprocessor proceeds to block 154 to install the keyed application to the disk.

Figure 8A:
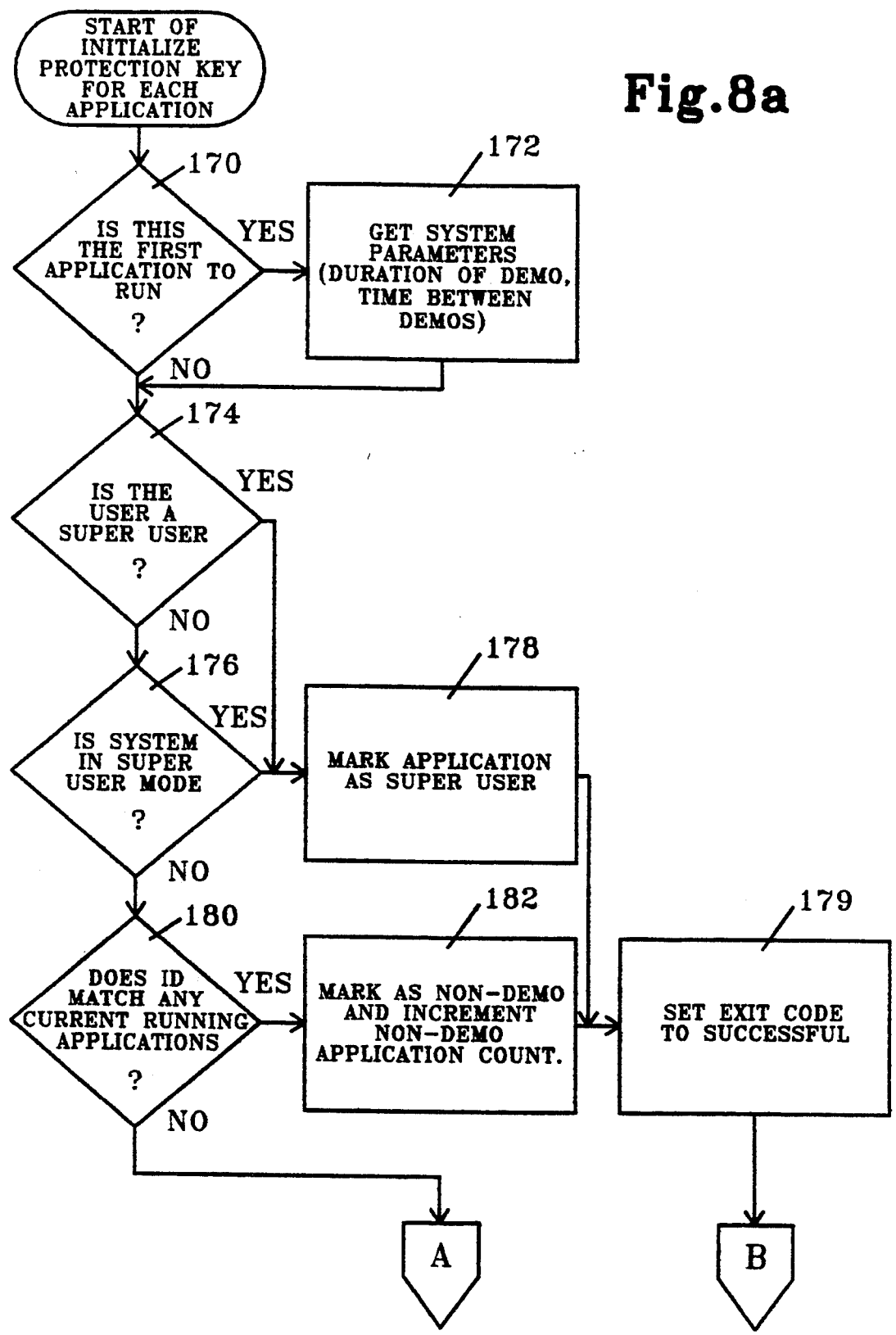
Figure 8B:
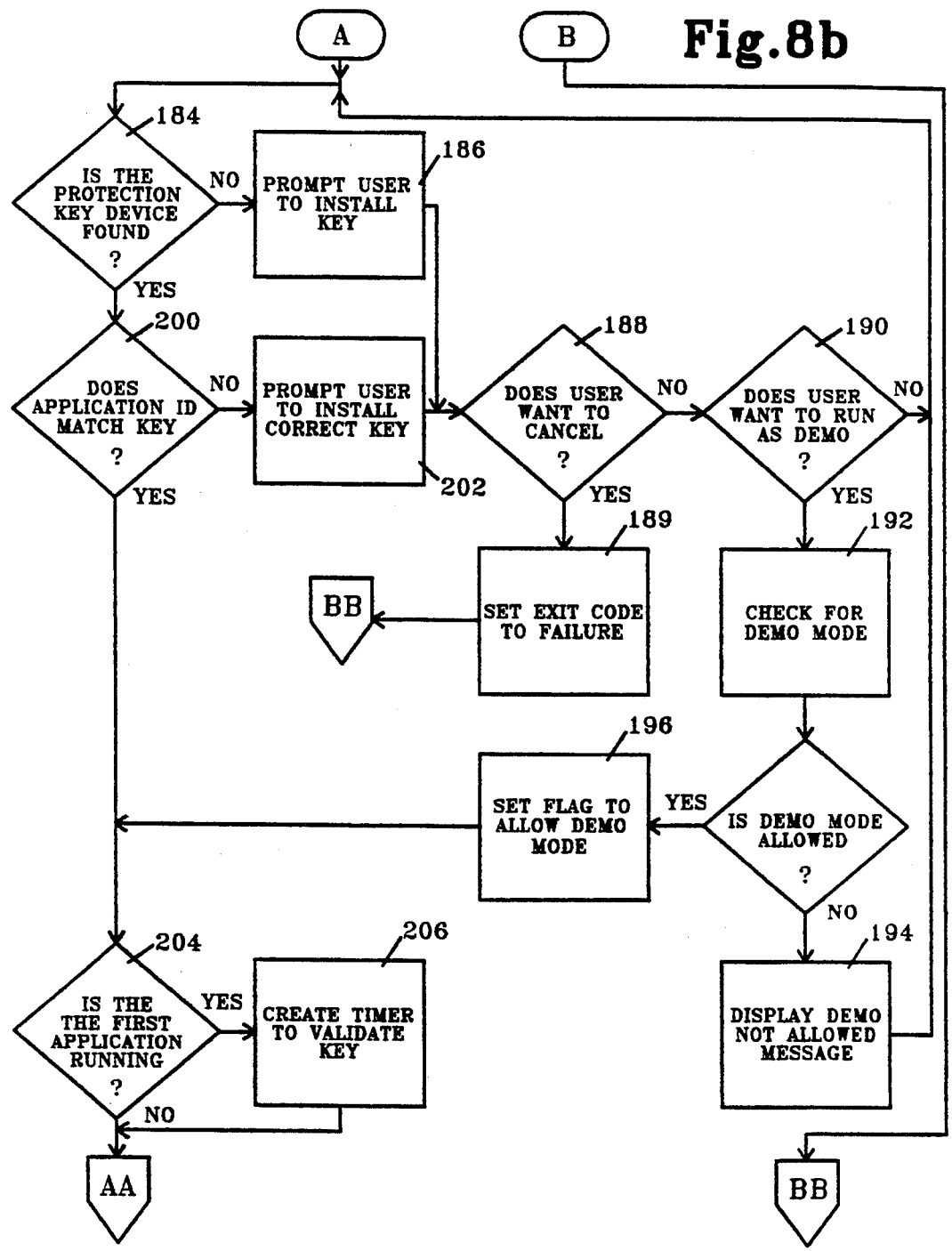

Upon the initialization of each of the software modules 222, 24, 26 and 28, each of the modules calls the key validation routine depicted in FIG. 8. Upon entering the key validation routine, the microprocessor 19 at block 170 determines whether this is the first application, i.e., software module to be validated and if so, the microprocessor proceeds to block 172. At block 172, the microprocessor 19 gets the system parameters including the maximum duration of time that the system allows applications to run in a demonstration mode between successive initializations and the minimum time successive allowable between successive initializations of an application in a demonstration mode. At a block 174 the microprocessor 19 determines whether an application is a super user. The microprocessor determines that an application is a super user if the application is keyed as such. Super users are applications that can get around the key protection of the system. The system can also have a flag that is set to indicate that the system itself is a super user, i.e., a flag indicating that the system is operating in a super user mode. If the microprocessor determines at block 174 that the application is a super user, the microprocessor at block 178 marks the application as such and at block 179 the microprocessor 19 exits the key validation routine with success. If the microprocessor determines at block 174 that the application is not a super user the microprocessor determines at block 176 whether the system is operating in the super user mode. If so, the microprocessor proceeds to block 178 to mark the application as a super user and at block 179 the processor exits the routine with success. If the application is not super user or the system is not operating in the super user mode, the microprocessor proceeds to block 180.

At block 180 the microprocessor 19 determines whether the application includes a key identification that matches the key identification of any currently running application. If so, the microprocessor proceeds to block 182 to mark the application as a non-demo application and further increments the count of a counter representing the number of non-demo applications of the system. If the microprocessor 19 determines at block 180 that the application does not include a key identification that matches any currently running application, the microprocessor proceeds to block 184. At block 184 the microprocessor determines whether the system key device, i.e., the Activator block, has been found or not. If the microprocessor 19 has not found the system key device, the microprocessor proceeds to block 186 to prompt the user via the display 18 to install the system key. Thereafter at block 188 the microprocessor determines whether the user wants to cancel and if so, the microprocessor at block 189 exits the key validation routine with a failure status. If the user does not want to cancel, the microprocessor proceeds from block 188 to block 190 to determine whether the user wants to run the application in a demonstration mode. If not, the microprocessor loops back to block 184 to determine whether the user has now installed the system key device. If the microprocessor determines at block 190 that the user does want to run the application in the demonstration mode, the microprocessor proceeds to block 192. At block 192 the microprocessor determines whether the demonstration of the application is allowable in accordance with the routine depicted in FIG. 9 discussed in detail below. If the microprocessor 19 determines that a demonstration is not allowed, the microprocessor at block 194 controls the display 18 to display a message that the demonstration of the application is not allowed. The microprocessor then proceeds from block 194 to block 184. If the microprocessor at block 192 determines that a demonstration of the application is allowed, the microprocessor at a block 196 sets a flag to indicate that the application will start in the demonstration mode and the microprocessor proceeds to block 204.

If the microprocessor determines at block 184 that the system key device is found, the microprocessor at block 200 determines whether the application includes a key identification that matches the system key identification found. If so, the microprocessor proceeds to block 204 to determine whether this is the first starting application of the system. If it is, the microprocessor 19 proceeds to block 206 to create a timer to validate the system key. More particularly, this is a timer that times out for example every 15 seconds causing the microprocessor to implement the timer event routine depicted in FIG. 10 discussed in detail below. At a block 208 the microprocessor then determines whether this application is starting in the demonstration mode and if not, the microprocessor proceeds to block 212. At block 212 the microprocessor 19 marks the application as a non-demo application and increments the count of non-demo applications for the system. If the microprocessor determines at block 208 that this application is going to start in the demonstration mode, the microprocessor proceeds to block 210 to mark the application as a demo application and increments a counter the count of which represents the number of demonstration applications that have run on the system. From block 210 or 212 the microprocessor 19 proceeds to block 214 to exit the key validation routine with success.

Figure 9:
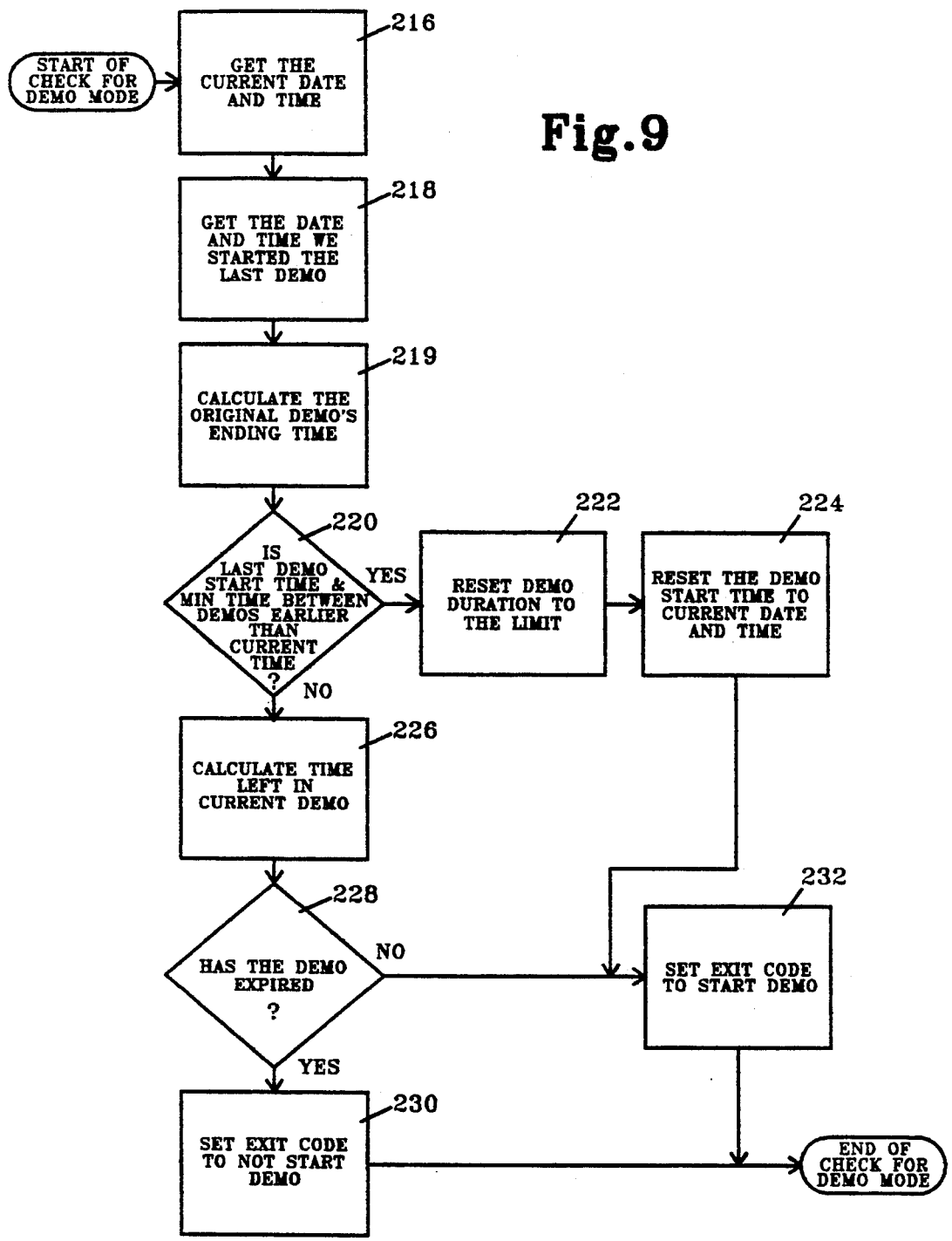
FIG. 9 is flow chart illustrating a routine to determine whether an application may run in a demonstration mode.

The microprocessor 19 determines whether an application can run in the demonstration mode in accordance with the flow chart depicted in FIG. 9. The microprocessor 19 at block 216 first retrieves the current date and time from the memory 20. Thereafter, at a block 218 the microprocessor retrieves the date and time at which the last demonstrated application was started or initialized. At block 220 the microprocessor 19 determines whether the time that the last application was first started, as determined at block 218, plus the minimum allowed time between demonstration starts is earlier than the current time. If it is, the microprocessor proceeds to block 222 to reset the timer monitoring the running time of demonstration applications and at block 224 to reset the date and time that the "last" application is being started in the demonstration mode to the current time so as to allow an application to be run in the demonstration mode. If however, the time that the last application was started in the demonstration mode plus the minimum allowed time between demonstration starts is after the current time, the microprocessor 19 proceeds to block 226. At block 226 the microprocessor determines whether there is any time left for an application to run in the demonstration mode, and if so, the microprocessor 19 proceeds from block 228 to block 232 to exit the routine with a start demonstration mode indication. If the maximum operating time for the demonstration mode has expired, the microprocessor exits the routine at block 230 with an indication that the application is not to start in the demonstration mode. From the above it is thus seen that there are two time limits on applications running in the demonstration mode. The first time limit represents the maximum time that an application is allowed to run in the demonstration mode which may be, for example, one hour. The second time limit represents the minimum time that must pass between successive starts or initializations of an application in the demonstration mode.

Figure 10:
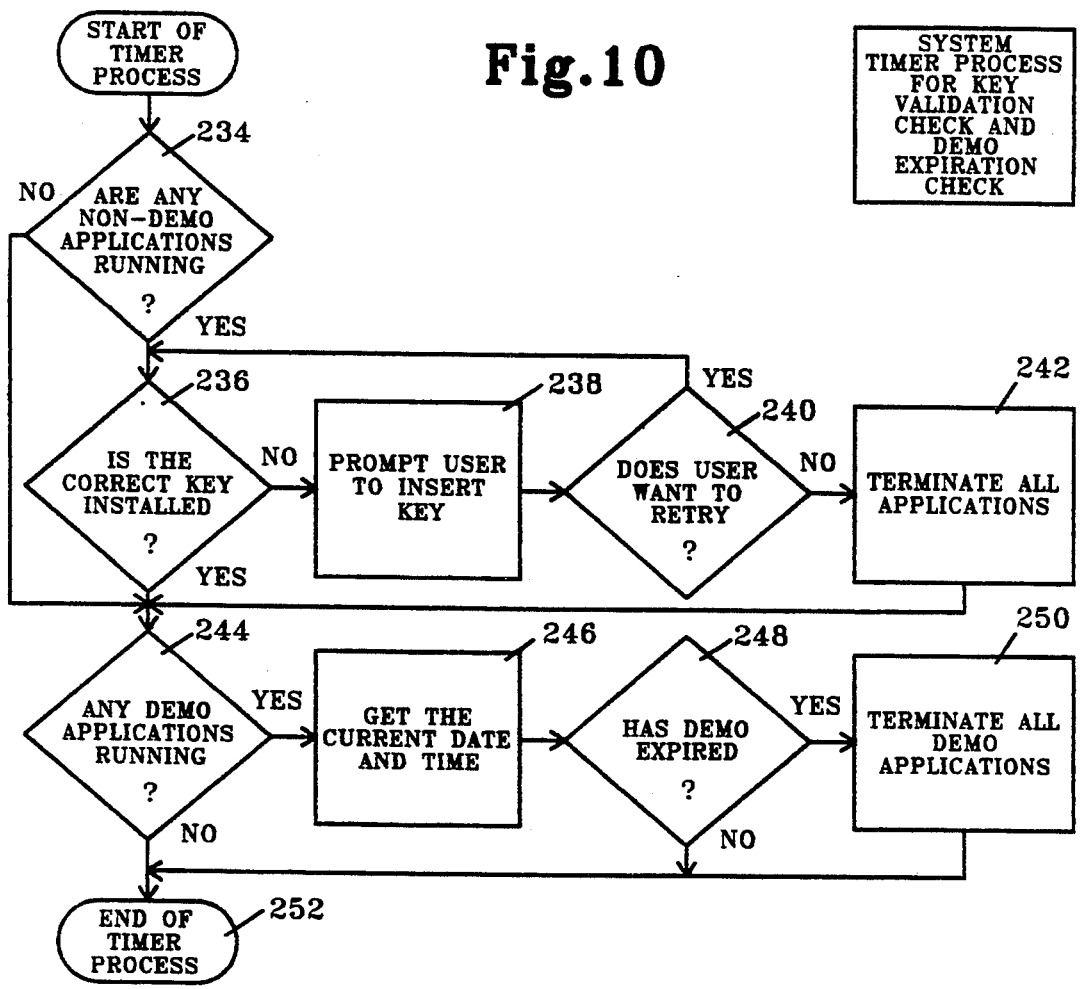
FIG. 10 is a flow chart illustrating a key timer software routine.

Each time the validate key timer, initialized at block 206, expires, the microprocessor calls the routine depicted in FIG. 10. Upon entering this routine, the microprocessor at block 234 determines whether there is a non-demo application and if so, the microprocessor proceeds to block 236. At block 236 the microprocessor determines whether the correct system key device is still connected to the parallel communication port of the P.C. and if so, the microprocessor proceeds to block 244. If the correct system key is not connected to the P.C. 14, the microprocessor 19 at block 238 prompts the user via the display 18 to insert the system key. Thereafter, the microprocessor 19 at block 240 determines whether the user wants to retry the system key validation and if so, the microprocessor loops back to block 236. If the microprocessor does not want to retry, the microprocessor proceeds to block 242 to terminate all of the applications or software modules. From blocks 234, 236 or 242 the microprocessor proceeds to block 244 to determine whether there are any applications running in the demonstration mode and if not, the microprocessor exits the routine at block 252. If there are applications running in the demonstration mode, the microprocessor at block 246 retrieves the current time and date and at block 248 determines whether the maximum demonstration running time has expired or not. If the maximum demonstration running time has expired the microprocessor proceeds to block 250 to terminate all of the applications that are running in the demonstration mode of operation, the microprocessor exiting the routine at block 252.

Figure 13:
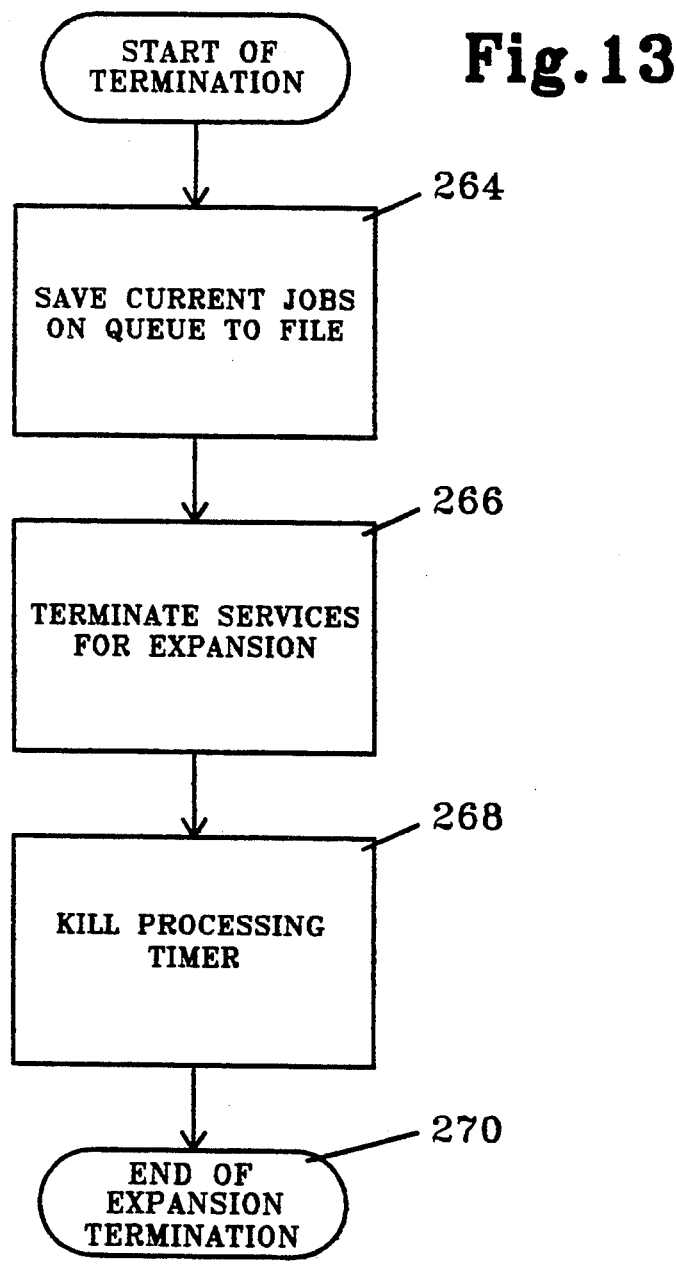
FIG. 13 is a flow chart illustrating an expansion termination routine.

With reference to FIG. 7, after the Expansion routine 26 has been initialized at block 150, the microprocessor proceeds to block 260. If the microprocessor 19 determines at block 260 that the initialization of the Expansion routine 26 has failed, the microprocessor proceeds to block 262 to call the routine depicted in FIG. 13 to terminate the expansion routine. More particularly, as shown in FIG. 13, the microprocessor at a block 264 saves current jobs on the expansion queue to a file. The microprocessor at block 266 then terminates services for the Expansion routine 26 and at block 268 kills the processing timer for the Expansion routine, exiting at block 270. If the microprocessor determines at block 260 that the initialization of the Expansion routine 26 has been successful, the microprocessor proceeds to block 272 to process any expansion messages. The microprocessor at block 274 determines whether a terminate message has been received and if not, the microprocessor continues to process messages at block 272.

Figure 12:
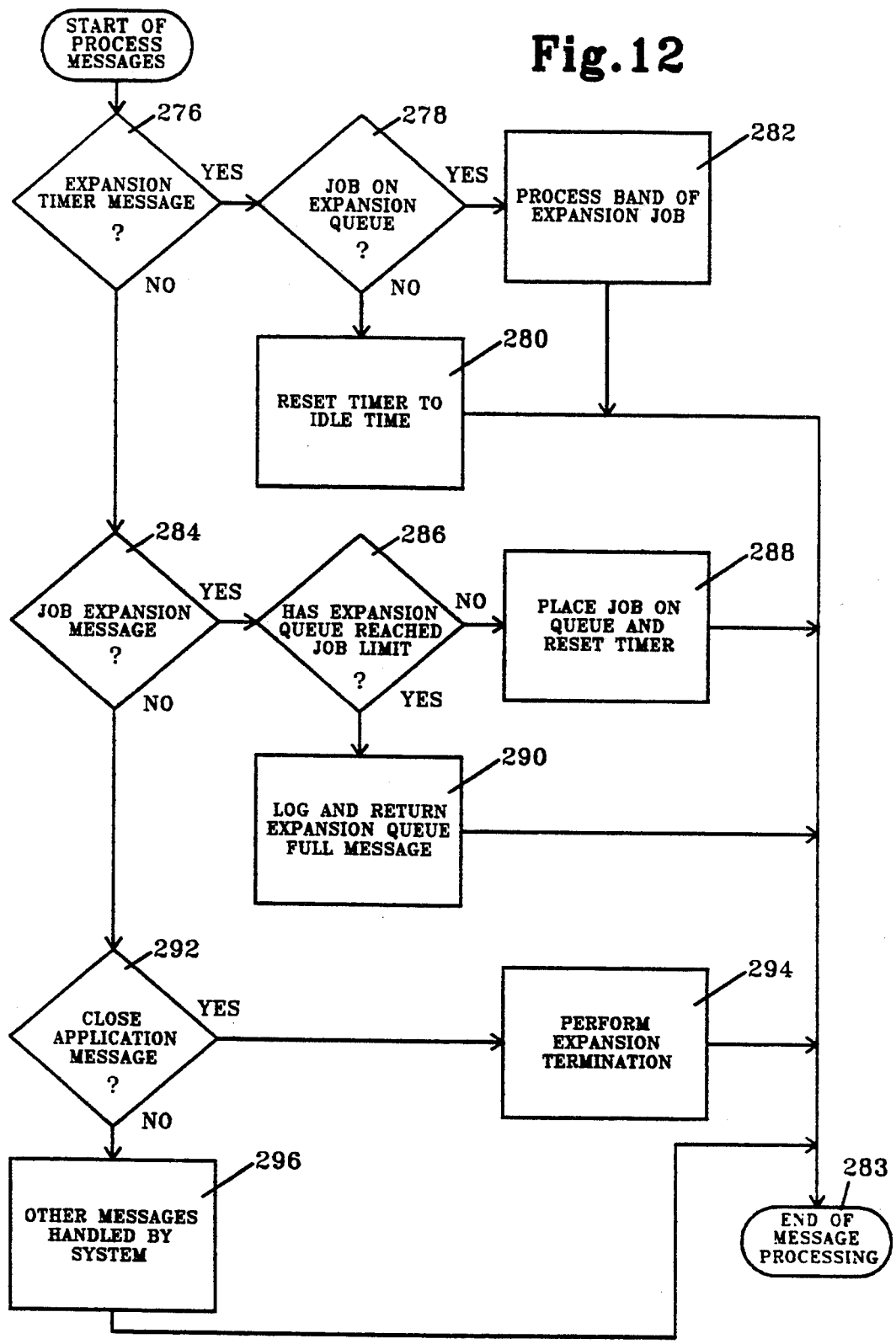
FIG. 12 is a flow chart illustrating an expansion process messages routine.

The microprocessor 19 processes expansion messages in accordance with the routine depicted in FIG. 12. Upon entering the routine, the microprocessor 19 at block 276 determines whether an expansion timer message has been received and if so, the microprocessor proceeds to block 278 to determine whether there are any jobs on the expansion queue. If there are jobs on the expansion queue, the microprocessor proceeds to block 282 to implement the routine depicted FIG. 14. If there are no jobs on the expansion queue, the microprocessor at block 280 resets the expansion timer to idle time and exits the routine at block 283. If the microprocessor determines that the expansion timer message was not received but that a job expansion message has been received, the microprocessor proceeds from a block 284 to a block 286. The microprocessor at block 286 determines whether the expansion queue has reached its limit for holding jobs and if not, the microprocessor proceeds to block 288 to place the job identified in the job expansion message on the expansion queue. The microprocessor at block 288 also resets the expansion timer, the microprocessor then exiting the routine at block 283. If the microprocessor determines at block 286 that the expansion queue has reached its limit, the microprocessor at block 290 logs this event in the expansion journal and returns to the calling routine with a message indicating that the expansion queue is full. If the microprocessor 19 determines at block 292 that a close application message has been received, the microprocessor proceeds to block 294 to implement the expansion termination routine depicted in FIG. 13 as discussed above. Otherwise, the microprocessor proceeds to block 296 to handle other miscellaneous expansion messages.

Figure 14:
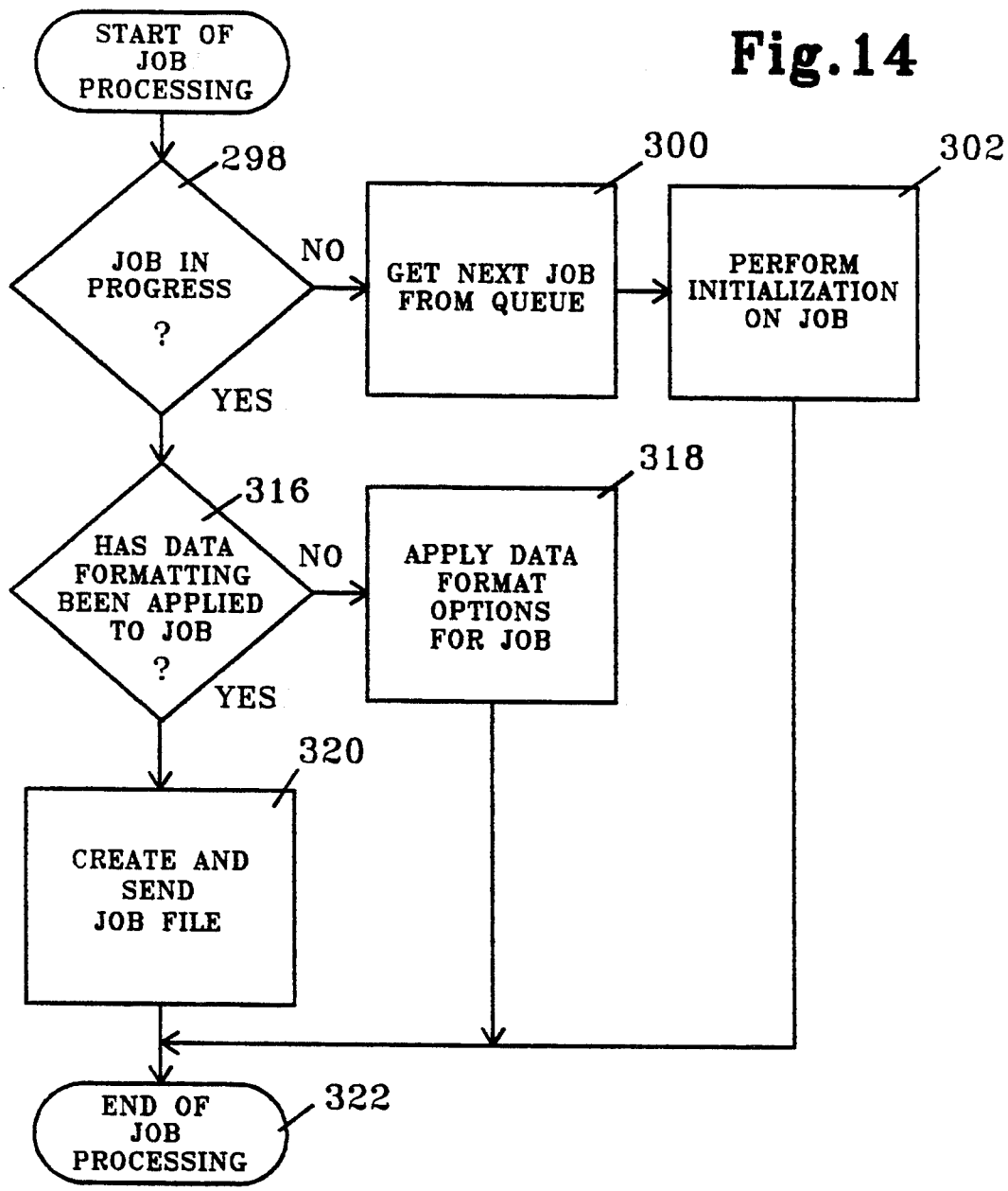
FIG. 14 is a flow chart illustrating an expansion process band of job routine.

When the expansion timer has expired and there is a job on the expansion queue, as determined by the microprocessor at blocks 276 and 278, the microprocessor calls the routine depicted in FIG. 14. Upon entering this routine, the microprocessor at block 298 determines whether there is a job in progress and if not, the microprocessor at block 300 gets the next job from the expansion queue. Thereafter, the microprocessor performs the initialization on the job at block 302, the initialization procedure being depicted in FIG. 16. Upon entering the job initialization routine, the microprocessor 19 at block 304 determines whether a print batch file request has been received and if so, the microprocessor proceeds to block 306. At block 306 the microprocessor 19 sends the jobs in a batch file to the spooler 28 to be printed and at block 308 the microprocessor removes the job from the expansion queue. Thereafter, the microprocessor 19 exits the initialization job routine at a block 310. If the microprocessor determines at block 304 that a print batch file request has not been received, the microprocessor at block 312 retrieves the format header and field information from the format file for the job. Thereafter, the microprocessor at block 314 retrieves the raw data from the batch file and converts any tilde sequence characters that are represented in raw data to byte values for easier processing thereof. The microprocessor then exits the job initialization routine at block 310.

Returning to FIG. 14, if the microprocessor determines at block 298 that a job is not in progress, the microprocessor proceeds to block 316. At block 316 the microprocessor 19 determines whether data formatting has been applied to the job and if not, the microprocessor at block 318 calls the routine depicted in FIG. 15 as discussed in detail below. If the data formatting has been applied to the job, the microprocessor proceeds from block 316 to block 320 to create and send the job file to the spooler 28 as discussed in detail below with reference to FIG. 21.

Figure 15:
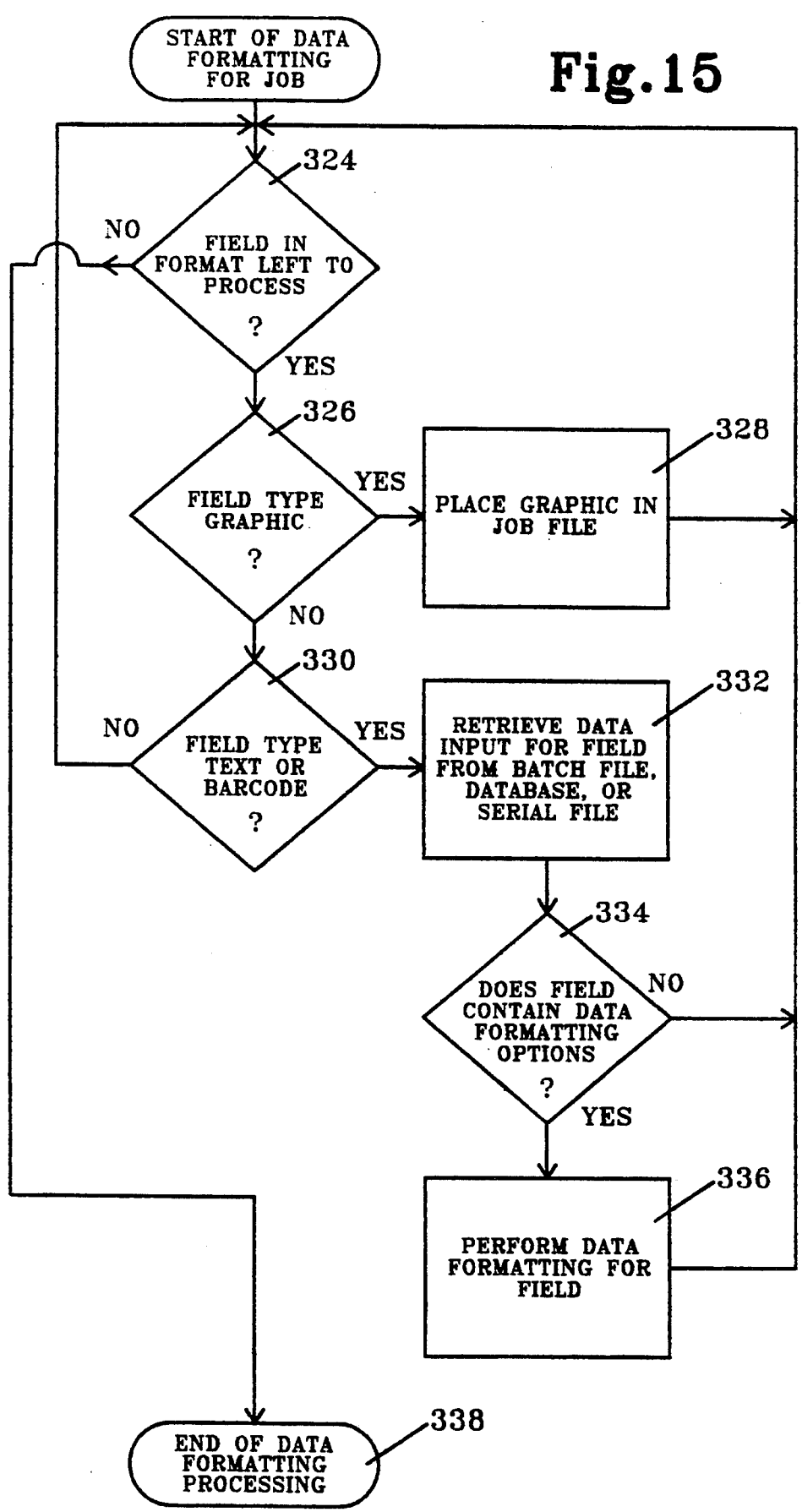
FIG. 15 is a flow chart illustrating an apply data format options for job routine.

The software routine called at block 318 is depicted in FIG. 15. Upon entering the routine, the microprocessor 19 at block 324 determines whether there are any fields in the job's format left to process and if so, the microprocessor proceeds to block 326. Otherwise, the microprocessor exits the routine at block 338. At block 326 the microprocessor 19 determines whether the field is a graphic field and if so, the microprocessor at block 328 places the graphic into the job file. From block 328 the microprocessor loops back to block 324. If the microprocessor determines at block 330 that the field is a text or a barcode, the microprocessor proceeds to block 332. At block 332 the microprocessor 19 receives the data input by the user for the field from the batch file, database or a serial file. Thereafter, the microprocessor at block 334 determines whether the field contains data formatting options and if so, the microprocessor performs data formatting for the field in accordance with the routine depicted in the flow charts of FIGS. 17A and 17B.

Figure 17A:
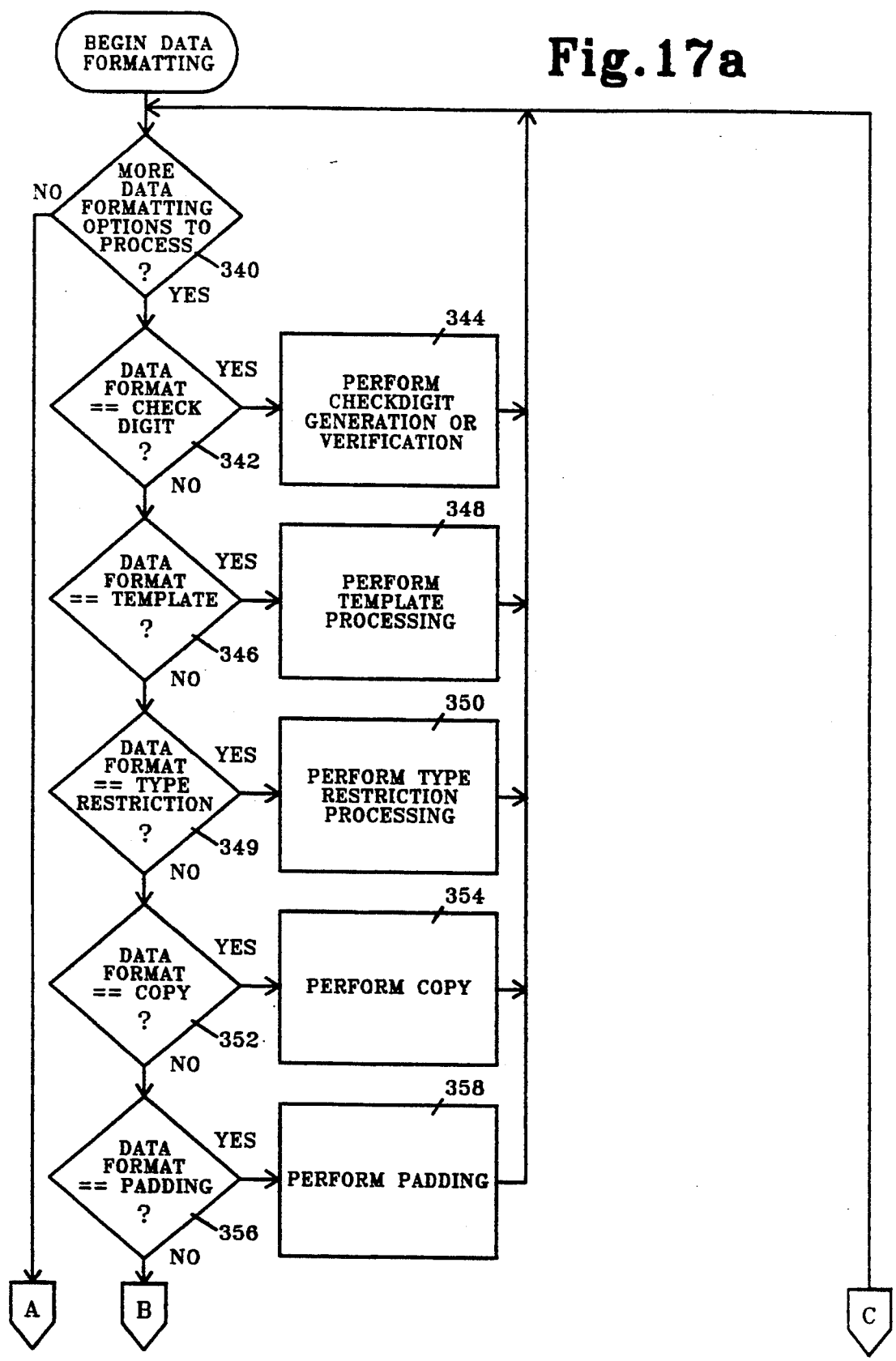
FIG. 17A and 17B form a flow chart illustrating a perform data formatting for fields routine.
Figure 17B:
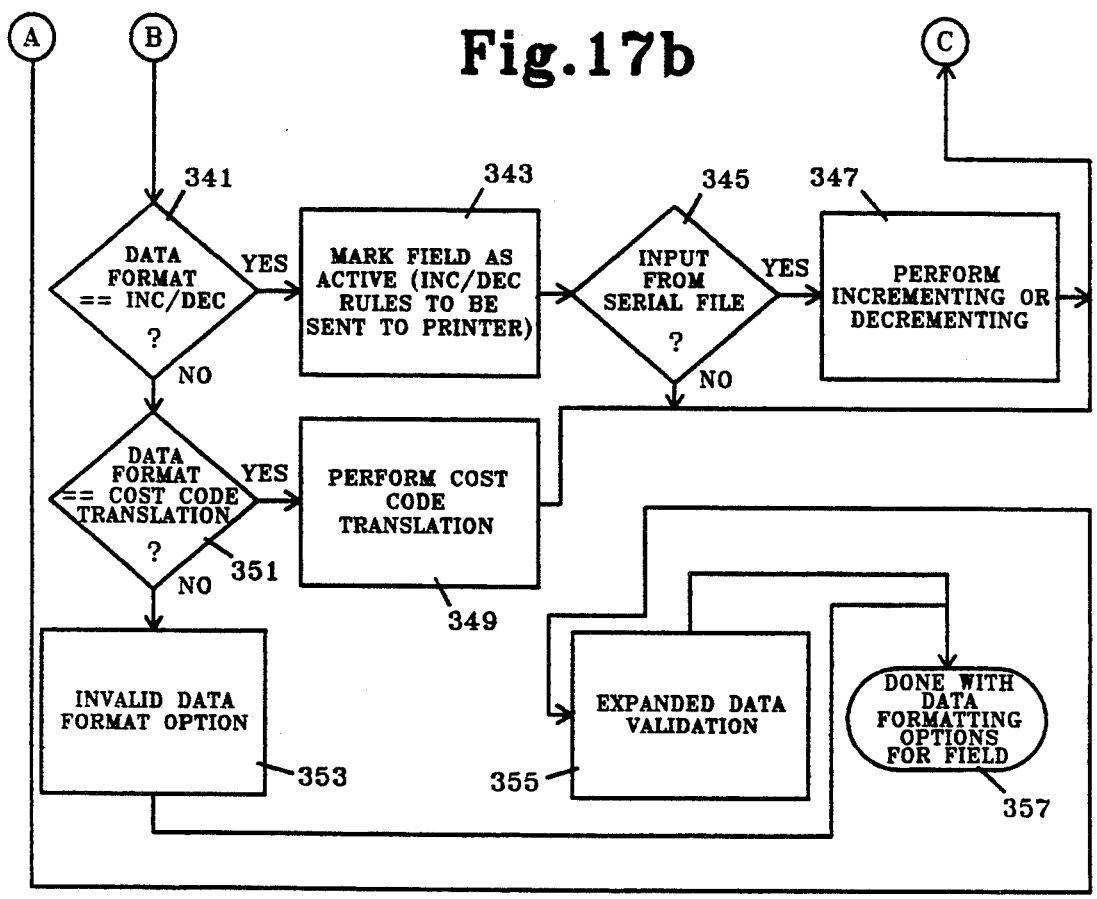

Upon entering the data formatting routine depicted in FIGS. 17A and B, the microprocessor at a block 340 determines whether there are any more data formatting options to process. If so, the microprocessor proceeds to block 342 to determine whether the data format option to be processed is a check digit. If the data format option to be processed is a check digit, the microprocessor proceeds to block 344 to perform check digit generation and verification. Thereafter, the microprocessor loops back to block 340. If the data format option to be processed is a template, the microprocessor proceeds to block 348 to process the template in accordance with the routine depicted in FIG. 18. If the microprocessor determines at block 349 that the data format option to be processed is a type restriction option, the microprocessor at block 350 performs the type restriction processing in accordance with the routine depicted in FIG. 19. If the data format option to be processed is the copy option as determined at block 352, the microprocessor performs the copy processing at block 354. Similarly, if the microprocessor at block 356 determines that the data format option to be processed is the padding option, the microprocessor 19 at block 358 performs the padding process. If the microprocessor at block 341 determines that the data format option is an increment/decrement option, the microprocessor proceeds to block 343 to mark the field as active so that the increment/decrement rules will be sent to the printer. Thereafter, the microprocessor at block 345 determines whether this is an input from a serial file and if so, the microprocessor at block 347 performs incrementing or decrementing with regard to the file, the microprocessor thereafter returning to block 340. If the microprocessor determines at block 351 that the data format option to be processed is a cost code translation, the microprocessor at block 349 performs the cost code translation and thereafter returns to block 340. When the microprocessor at block 340 determines that there are no more data formatting options to process, the microprocessor proceeds to block 355 to implement the expand data validation routine as depicted in FIG. 20. Thereafter, the microprocessor 19 exits the routine at block 357.

Figure 18:
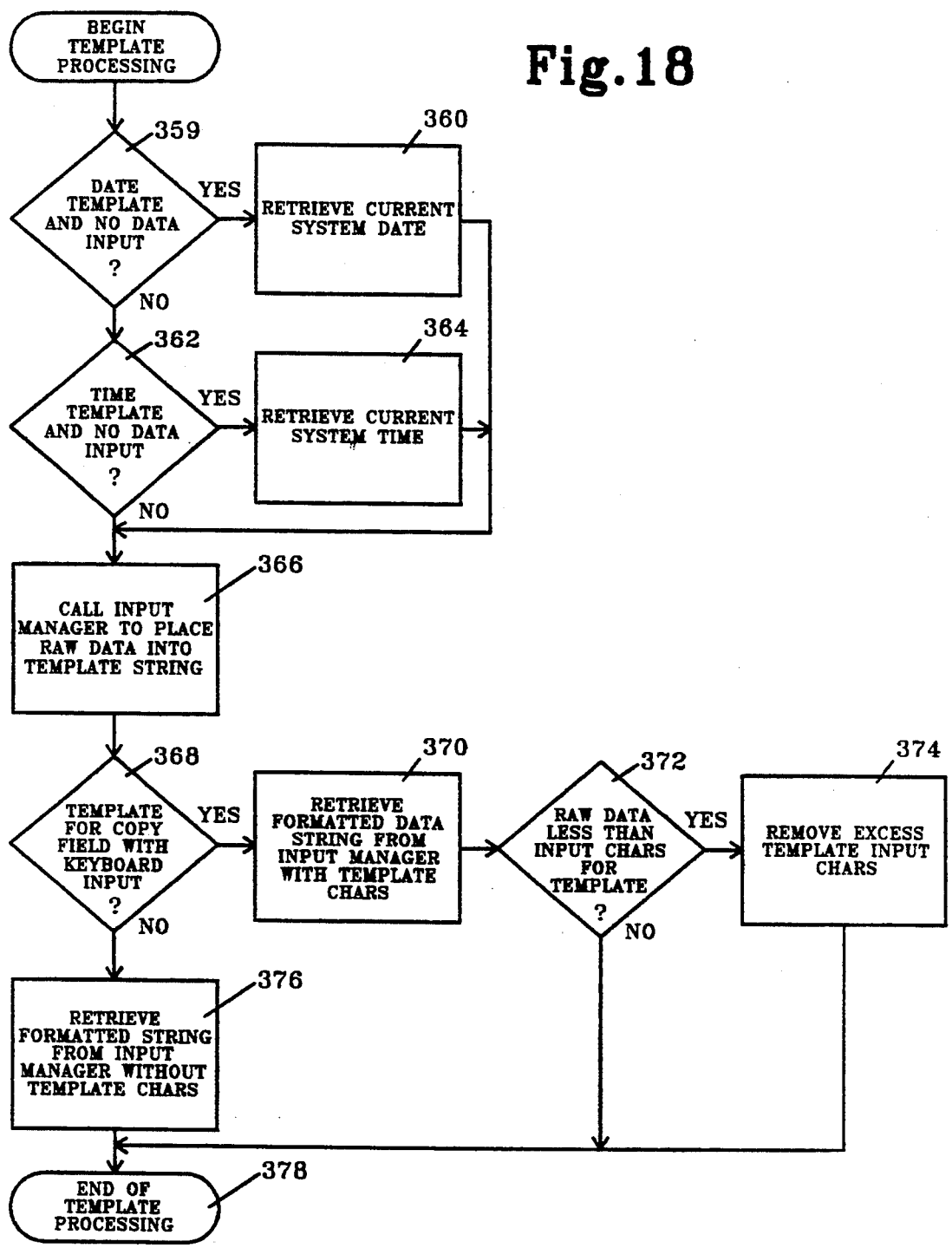
FIG. 18 is a flow chart illustrating a perform template processing routine.

Upon entering the template processing routine depicted in FIG. 18, the microprocessor at block 359 determines whether the template to be processed is a date template and further determines whether there is any data input. If the template is a date template having no data input, the microprocessor proceeds to block 360 to retrieve the current system date for the template. If the microprocessor at block 362 determines that the template is a time template having no data input, the microprocessor proceeds to block 364. At block 364 the microprocessor 19 retrieves the current system time for the template. At block 366, the microprocessor calls an input manager routine to place the raw data into the template string. Thereafter, at block 368 the microprocessor determines whether the template is for a copy field accompanied by a keyboard input. If so, the microprocessor at block 370 retrieves the formatted data string from the input manager with the template characters. Thereafter, the microprocessor determines at block 372 whether the raw data retrieved is less than the number of input character positions for the template and if so, the microprocessor at block 374 removes the excess template input characters. If the microprocessor determines at block 368 that the template is not for a copy field with a keyboard input, the microprocessor proceeds to block 376 to retrieve the formatted string from the input manager without template characters. Thereafter, the microprocessor exits the routine at block 378.

Figure 19:
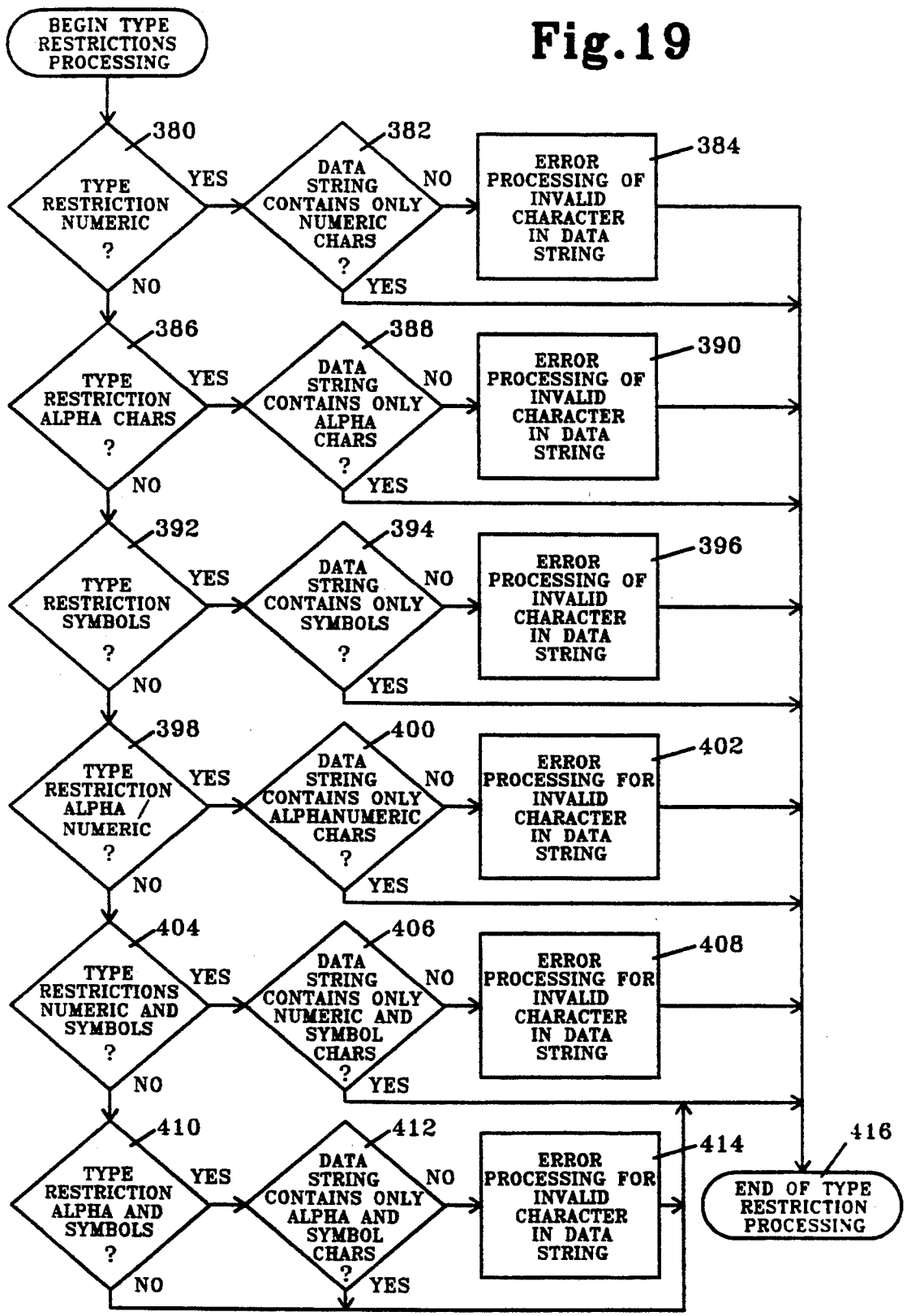
FIG. 19 is a flow chart illustrating a type restrictions processing routine.
Figure 20:
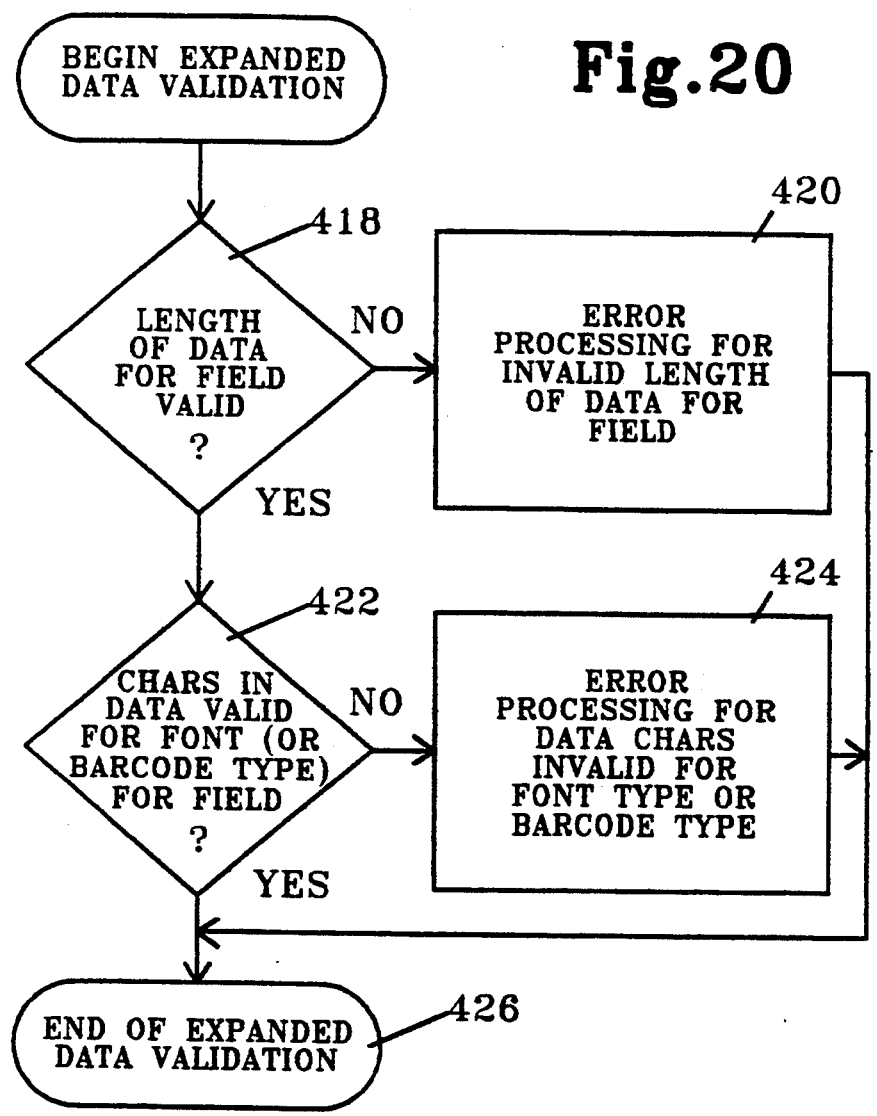
FIG. 20 is a flow chart illustrating an expanded data validation routine.

Upon entering the routine depicted in FIG. 19 for processing type restrictions, the microprocessor at a block 380 determines whether the type restriction is numeric and if so, the microprocessor proceeds to block 382 to determine whether the data string input by the user contains only numeric characters. If the data string does not contain only numeric characters, the microprocessor at block 384 implements error processing for invalid characters in a data string, the microprocessor exiting the routine depicted in FIG. 19 at block 416. If the microprocessor determines at block 386 that the type restriction to be processed is an alpha character type restriction, the microprocessor proceeds to block 388. At block 388 the microprocessor determines whether the data string entered by the user contains only alpha characters and if not, the microprocessor at block 390 implements the error processing of invalid characters in a data string. If the microprocessor determines at block 392 that the type restriction is a symbol type restriction, the microprocessor proceeds to block 394. At block 394 the microprocessor determines whether the entered data string contains only symbols and if not, the microprocessor at block 396 implements error processing of invalid characters in a data string. If the microprocessor determines at block 398 that the type restriction is an alpha/numeric type restriction, the microprocessor proceeds to block 400. At block 400 the microprocessor determines whether the data string contains only alphanumeric characters and if not, the microprocessor proceeds to block 402 to implement the error processing for invalid characters in a data string. If the microprocessor determines at block 404 that the type restriction is a numeric and symbol type restriction, the microprocessor proceeds to block 406. At block 406 the microprocessor determines whether the entered data string contains only numeric or symbol characters. If not, the microprocessor proceeds to block 408 to implement the error processing for invalid characters in a data string. If the microprocessor determines at block 410 that the type restriction to be processed is an alpha and symbol type restriction, the microprocessor proceeds to block 412. At block 412, the microprocessor determines whether the data string contains only alpha or symbol characters and if not, the microprocessor at block 414 implements the error processing for invalid characters in a data string.

Upon entering the expand data validation routine depicted in FIG. 20, the microprocessor at block 418 determines whether the length of data for a given field is valid. If not, the microprocessor at a block 420 performs error processing for an invalid length of data for a field. If the microprocessor at block 422 determines that the characters in the data field are not valid for the font or barcode type specified for the field, the microprocessor proceeds to block 424 to perform error processing for data characters that are invalid for the specified font type or barcode type. Thereafter, the microprocessor exits the routine at block 426.

Figure 21:
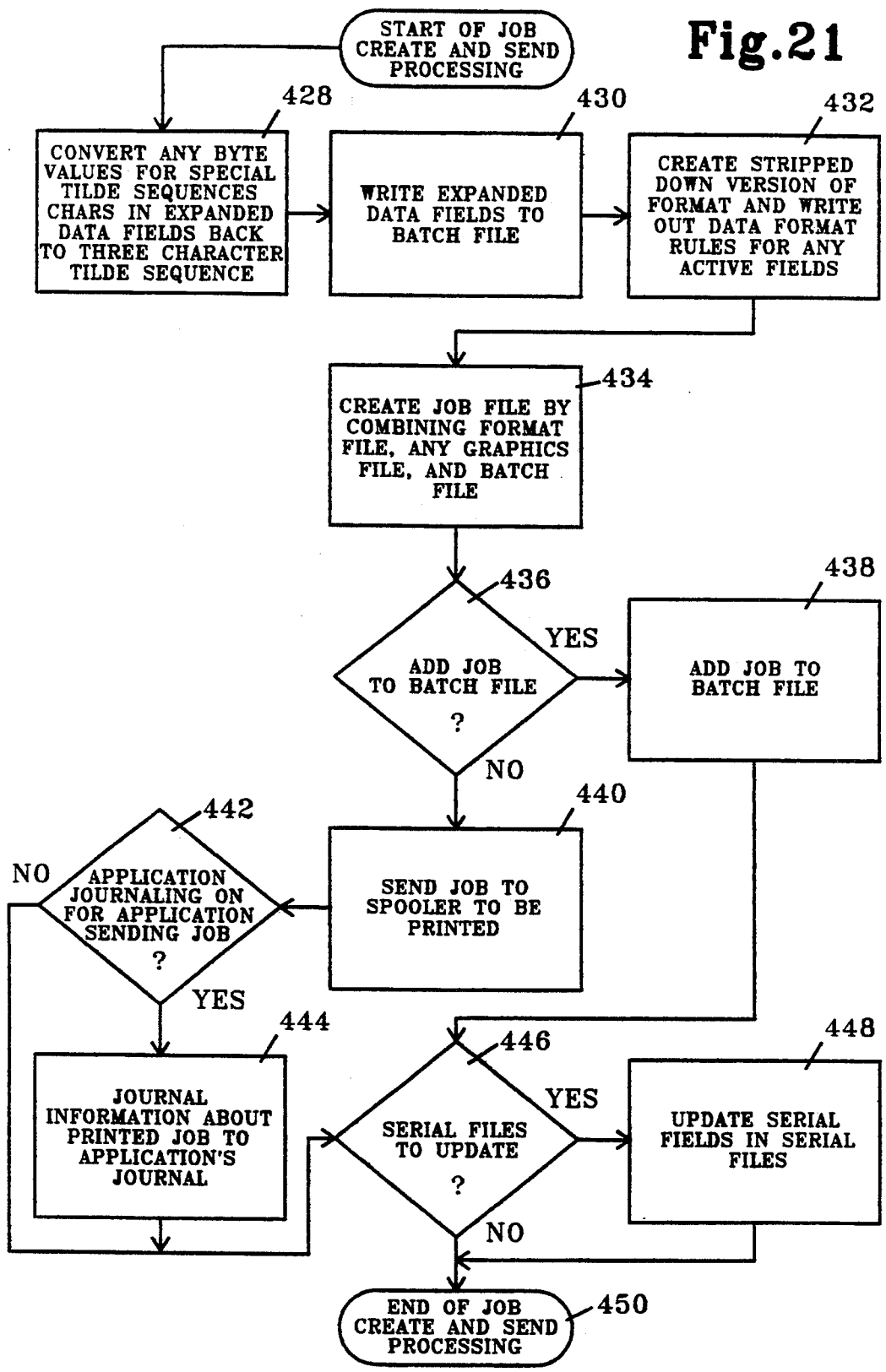
FIG. 21 is a flow chart illustrating a create and send expansion job routine.

Upon entering the routine depicted in FIG. 21 to create and send an expansion job to the spooler 28, the microprocessor at block 428 converts any byte values for special tilde sequence characters in an expanded data field back to the three character tilde sequence entered by the user. Thereafter, the microprocessor at block 430 sends the expanded data field to a batch file. The microprocessor 19 at block 342 creates a stripped down version of the format specified for the job and writes out the data format rules for any active fields. At block 434 the microprocessor creates a job file by combining the format file, graphics file and batch file. Thereafter, the microprocessor 19 determines at block 436 whether the job is to be added to a batch file and if so, the microprocessor proceeds to block 438 to add the job to a batch file for storage. If the job is not to be added to a batch file, the microprocessor proceeds from block 436 to block 440. At block 440 the microprocessor 19 sends the job to the spooler 28 so that the spooler may transmit the job to a printer 10, 11, 12 or 13 to be printed. From block 440, the microprocessor proceeds to block 442 to determine whether application journaling is on the software module sending the job. If so, the microprocessor 19 proceeds to block 444 to log information about the printed job to the application's journal. From block 442, the microprocessor proceeds to block 446 to determine whether there are serial files to update and if so, the microprocessor at block 448 updates the serial files. The microprocessor exits the routine depicted in FIG. 21 at block 450.

Figure 22:
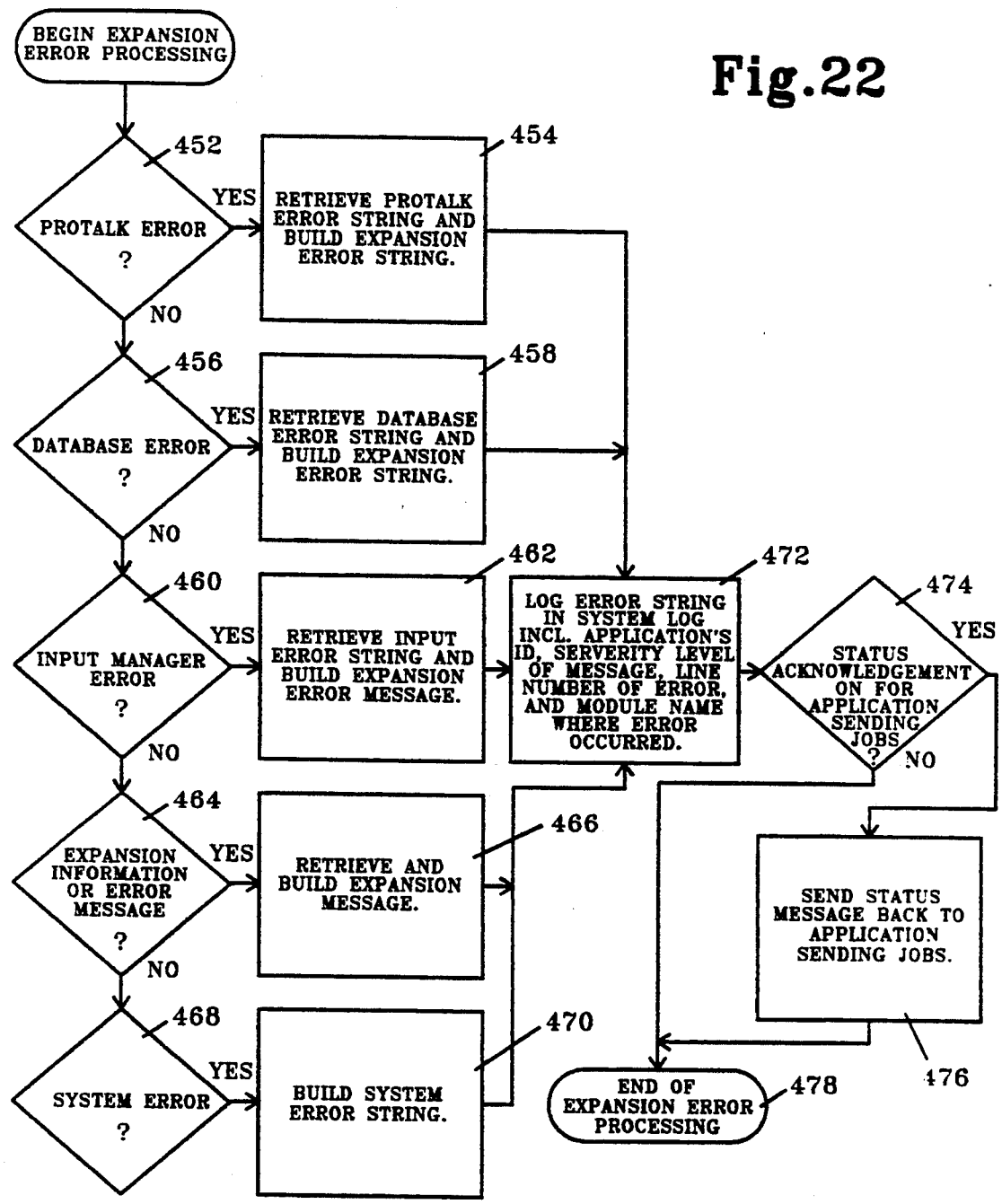
FIG. 22 is a flow chart illustrating an expansion error processing routine in accordance with the present invention.

Upon entering the routine depicted in FIG. 22, the microprocessor at block 452 determines whether there is a PROTALK error. PROTALK is the language in which format packets, data packets as well as graphic packets are created. PROTALK is a tag addressable language wherein each of the tags except for section and packet tags have a default value associated therewith. If the microprocessor 19 determines that a PROTALK error has occurred, the microprocessor at block 454 retrieves a PROTALK error string and builds and expansion error string. Thereafter, the microprocessor 19 proceeds to block 472. If the microprocessor determines at block 456 that a database error has occurred, the microprocessor at block 458 retrieves the database error string and builds an expansion error string, the microprocessor proceeding to block 472. If the microprocessor determines at block 460 that an input manager error has occurred, the microprocessor proceeds to block 462. At block 462, the microprocessor 19 retrieves the input manager error string and builds an expansion error message, the microprocessor thereafter proceeding to block 472. If the microprocessor determines at block 464 that an expansion error message has occurred, the microprocessor proceeds to block 466 to retrieve and build an expansion message. Thereafter, the microprocessor proceeds to block 472. If the microprocessor determines at block 468 that a system error has occurred, the microprocessor proceeds to block 470 to build a system error string. Thereafter, the microprocessor proceeds to block 472. At block 472 the microprocessor 19 logs the error string into the system log including the identity of the application in which the error occurred, the severity level of the error message, the line number in the application where the error occurred and the name of the module where the error occurred. Thereafter, the microprocessor 19 proceeds to block 474. At block 474, the microprocessor determines whether the status acknowledgement is on for the application sending the job and if not, the microprocessor exits the routine at block 478. If, however, the microprocessor 19 determines that the status acknowledgement is on, the microprocessor proceeds to block 476 to send a status message back to the application sending the job.

Many modifications and variations of the present invention are possible in light of the above teachings. Thus it is to be understood that, within the scope of the appended claims, the invention may be practiced otherwise than as described hereinabove.

What is claimed and desired to be secured by Letters Patent is:

1. A method of limiting the operation of a barcode identification system including at least one barcode printer for printing on a web of record members, and a processor for controlling a plurality of operations of said system, said system having an associated system key with a unique identification associated therewith comprising:

operating said processing means in accordance with a plurality of software modules, said processing means operating in accordance with at least one of said modules to generate barcode identification information for said barcode printer;

prior to the operation of at least one of said software modules, determining whether said one software module includes a key identification that matches said system key identification; and limiting the operation of said one software module if said determining means determines that said software module does not include a key that matches said system key identification.

2. A method of limiting the operation of a barcode identification system as recited in claim 1 wherein said step of limiting includes limiting the time that said one software module can operate.

3. A method of limiting the operation of a barcode identification system as recited in claim 2 wherein said step of limiting includes limiting the time between successive limited operations of said one software module.

4. A method of limiting the operation of a barcode identification system as recited in claim 1 wherein said system key is removable and further including the steps of periodically determining whether said system key has been removed; and means for terminating the operation of all of said software modules if said periodic determining means determines that said system key has been removed.

5. A method of limiting the operation of a barcode identification system as recited in claim 1 wherein said step of limiting includes limiting the operation of said one software module to a demonstration mode.

6. A method of limiting the operation of a barcode identification system including at least one barcode printer for printing on a web of record members, and a processor for controlling a plurality of operations of said system, said system having an associated system key with a unique identification associated therewith comprising:

operating said processing means in accordance with software modules, said processing means operating in accordance with at least one of said modules to generate barcode identification information for said barcode printer;

prior to the operation of each one of a plurality of said software modules, determining whether said one software module includes a key identification that matches said system key identification; and limiting the operation of said one software module if said determining means determines that said software module does not include a key that matches said system key identification.

7. A method of limiting the operation of a barcode identification system as recited in claim 6 wherein said step of limiting includes limiting the time that said one software module can operate.

8. A method of limiting the operation of a barcode identification system as recited in claim 6 wherein said step of limiting includes limiting the time between successive limited operations of said one software module.

9. A method of limiting the operation of a barcode identification system as recited in claim 6 wherein said system key is removable and further including the steps of periodically determining whether said system key has been removed; and means for terminating the operation of all of said software modules if said periodic determining means determines that said system key has been removed.

10. A method of limiting the operation of a barcode identification system as recited in claim 6 wherein said step of limiting includes limiting the operation of said one software module to a demonstration mode.

* * * * *